US012550212B2

(12) United States Patent
Lee et al.

(10) Patent No.: US 12,550,212 B2
(45) Date of Patent: Feb. 10, 2026

(54) ELECTRONIC DEVICE COMPRISING MULTIPLE SUBSCRIBER IDENTITY MODULES AND OPERATION METHOD THEREOF

(71) Applicant: SAMSUNG ELECTRONICS CO., LTD., Suwon-si (KR)

(72) Inventors: Sanghyun Lee, Suwon-si (KR); Jungmin Oh, Suwon-si (KR); Yonghyon Kim, Suwon-si (KR); Sungjuhn Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 371 days.

(21) Appl. No.: 18/121,872

(22) Filed: Mar. 15, 2023

(65) Prior Publication Data

US 2023/0284304 A1 Sep. 7, 2023

Related U.S. Application Data

(63) Continuation of application No. PCT/KR2023/002336, filed on Feb. 17, 2023.

(30) Foreign Application Priority Data

Mar. 3, 2022 (KR) ........................ 10-2022-0027277

(51) Int. Cl.
*H04W 76/15* (2018.01)
*H04L 65/1016* (2022.01)
*H04W 76/30* (2018.01)

(52) U.S. Cl.
CPC ......... *H04W 76/15* (2018.02); *H04L 65/1016* (2013.01); *H04W 76/30* (2018.02)

(58) Field of Classification Search
None
See application file for complete search history.

(56) References Cited

U.S. PATENT DOCUMENTS 9,288,646 B2 * 3/2016 Ponukumati ............ H04W 4/16
10,470,123 B2 * 11/2019 Kim ....................... H04W 76/28
(Continued)

FOREIGN PATENT DOCUMENTS

CN 112640552 4/2021
CN 112714431 A 4/2021
(Continued)

OTHER PUBLICATIONS

International Search Report dated May 23, 2023 for PCT/KR2023/002336.
(Continued)

*Primary Examiner* — Chirag G Shah
(74) *Attorney, Agent, or Firm* — NIXON & VANDERHYE P.C.

(57) ABSTRACT

An apparatus and/or a method for providing dual connectivity (DC) in an electronic device which may include multiple SIMs. An electronic device may include: a first SIM comprising first subscriber identity information; a second SIM comprising second subscriber identify information; a wireless communication circuit; and at least one processor operatively connected to the first SIM, the second SIM, and the communication circuit, wherein the at least one processor: connects to a first MCG network or a first SCG network, based on the first subscriber identity information when data communication using the first subscriber identity information is configured; identifies a state of communication with the first MCG network; restricts addition of a second SCG network, based on the second subscriber identity information when the state of communication with the first MCG network is a connected state; and allows addition of the
(Continued)

second SCG network, based on the second subscriber identity information when the state of communication with the first MCG network is in an idle state. Other embodiments may be also possible.

20 Claims, 17 Drawing Sheets

(56) References Cited

U.S. PATENT DOCUMENTS

| | | | |
|---|---|---|---|
| 10,511,981 B2 | 12/2019 | Lee et al. | |
| 11,445,359 B2 | 9/2022 | Jha et al. | |
| 12,184,563 B2* | 12/2024 | Teyeb | H04W 36/0088 |
| 2016/0142998 A1 | 5/2016 | Tsai et al. | |
| 2018/0124868 A1 | 5/2018 | Gupta et al. | |
| 2020/0059333 A1* | 2/2020 | Paladugu | H04W 76/16 |
| 2020/0296638 A1 | 9/2020 | Tsai et al. | |
| 2020/0396591 A1 | 12/2020 | Ou et al. | |
| 2021/0014667 A1 | 1/2021 | Lovlekar et al. | |
| 2021/0227376 A1 | 7/2021 | Jha et al. | |
| 2021/0266801 A1 | 8/2021 | Shah et al. | |
| 2021/0345432 A1 | 11/2021 | Yang et al. | |
| 2022/0117018 A1* | 4/2022 | Gu | H04W 8/183 |
| 2022/0240079 A1 | 7/2022 | Lovlekar et al. | |
| 2023/0262501 A1* | 8/2023 | Rugeland | H04W 76/27 370/252 |
| 2023/0319920 A1* | 10/2023 | Xie | H04W 76/15 370/328 |
| 2023/0362817 A1* | 11/2023 | Da Silva | H04W 24/10 |
| 2023/0362978 A1* | 11/2023 | Xie | H04L 5/0096 |
| 2024/0032135 A1* | 1/2024 | Cheng | H04W 24/10 |
| 2024/0155328 A1* | 5/2024 | Fu | H04W 52/0219 |
| 2024/0244688 A1* | 7/2024 | Sheik | H04W 76/15 |
| 2024/0357693 A1* | 10/2024 | Zou | H04W 76/27 |

FOREIGN PATENT DOCUMENTS

| | | | |
|---|---|---|---|
| EP | 3 764 717 A2 | 1/2021 | |
| EP | 4124165 A1 * | 1/2023 | H04W 76/15 |
| KR | 10-2017-0038760 A | 4/2017 | |
| KR | 10-2021-0039498 | 4/2021 | |
| WO | WO-2020045952 A1 * | 3/2020 | H04W 76/16 |
| WO | WO 2023/167452 A1 | 9/2023 | |

OTHER PUBLICATIONS

PCT Notification of Publication dated Sep. 7, 2023 for PCT/KR2023/002336.
Futurewei. RAN2 dated Oct. 2020; impacts of multi-SIM UE notifications on network switching. R2-2010620. 3GPP TSG-RAN WG2 meeting #112 electronic. Online. section.3 Oct. 2020.
Extended European Search Report dated Feb. 13, 2025 for EP Application No. 23763651.9.
Nokia et al: "Scenarios and Impact analysis for Switching Notification", 3GPP Draft; R2-2009265, 3rd Generation Partnership Project (3GPP), Mobile Competence Centre ; 650, Route Des Lucioles ; F-06921 Sophia-Antipolis Cedex ; France vol. RAN WG2, No. Electronic; Nov. 2, 2020-Nov. 13, 2020.

* cited by examiner

ELECTRONIC DEVICE COMPRISING MULTIPLE SUBSCRIBER IDENTITY MODULES AND OPERATION METHOD THEREOF

CROSS-REFERENCE TO RELATED APPLICATIONS

This application is a continuation of International Application No. PCT/KR2023/002336, designating the United States, filed on Feb. 17, 2023, in the Korean Intellectual Property Receiving Office, and claiming priority to Korean Patent Application No. 10-2022-0027277, filed on Mar. 3, 2022, in the Korean Intellectual Property Office, the disclosures of all of which are hereby incorporated by reference herein in their entireties.

BACKGROUND

Field

Various example embodiments relate to an apparatus for providing dual connectivity in an electronic device including multiple subscriber identity modules (SIMs), and an operation method thereof.

Description of Related Art

An electronic device may include a subscriber identity module (SIM) for managing personal information related to various functions such as user authentication, charging, and security functions.

The electronic device may perform wireless communication based on subscriber identity information stored in the subscribe identity module. When the electronic device includes multiple subscriber identity modules, the electronic device may perform wireless communication based on subscriber identity information stored in each of the subscriber identity modules.

SUMMARY

When an electronic device includes multiple subscriber identity modules, the electronic device may independently perform wireless communication based on each of the subscriber identity modules. For example, the electronic device may perform wireless communication with a first cellular network, based on first subscriber identity information stored in a first subscriber identity module through a communication protocol stack related to the first subscriber identity module. For example, the electronic device may perform wireless communication with a second cellular network, based on second subscriber identity information stored in a second subscriber identity module through a communication protocol stack related to the second subscriber identity module.

An electronic device including multiple subscriber identity modules may support dual connectivity (DC) through a communication protocol stack related to each of the subscriber identity modules. When the electronic device simultaneously supports dual connectivity through communication protocol stacks related to the multiple subscriber identity modules, the complexity (e.g., hardware complexity and/or software complexity) of the electronic device for supporting dual connectivity of each of the communication protocol stacks and current consumption may increase.

Various example embodiments may provide an apparatus and/or a method for providing dual connectivity (DC) in an electronic device including multiple subscriber identity modules.

According to various example embodiments, an electronic device may include a first subscriber identity module including first subscriber identity information, a second subscriber identity module including second subscriber identity information, a wireless communication circuit, and at least one processor operatively connected, directly or indirectly, to the first subscriber identity module, the second subscriber identity module, and the communication circuit, wherein the at least one processor may connect, directly or indirectly, to a first MCG network or the first MCG network and a first SCG network, based on the first subscriber identity information when data communication using the first subscriber identity information is configured, identifies a state of communication with the first MCG network, restricts addition of a second SCG network, based on the second subscriber identity information when the state of communication with the first MCG network is a connected state, and allow addition of the second SCG network, based on the second subscriber identity information when the state of communication with the first MCG network is an idle state.

According to various example embodiments, an operation method of an electronic device including multiple subscriber identity modules (SIMs) may include connecting, directly or indirectly, to a first master cell group (MCG) network or the first MCG network and a first secondary cell group (SCG) network, based on the first subscriber identity information when data communication using the first subscriber identity information included in a first SIM among the multiple SIMs is configured, identifying a state of communication with the first MCG network, restricting addition of a second SCG network, based on the second subscriber identity information of a second SIM when the state of communication with the first MCG network is a connected state, and allowing addition of the second MCG network, based on the second subscriber identity information when the state of communication with the first MCG network is an idle state.

According to various example embodiments, an electronic device including multiple subscriber identity modules may selectively deactivate (or activate) dual connectivity (DC) with a first cellular network based on a first subscriber identity module used for data communication and a second cellular network based on a second subscriber identity module not used for data connection, based on a connected state of communication with the first cellular network, thereby reducing the complexity of the electronic device and current consumption due to unnecessary dual connectivity (DC) related to the second subscriber identity module, and enhancing the quality of data communication related to the first subscriber identity module.

According to various example embodiments, when data communication based on a first subscriber identity module is configured, an electronic device including multiple subscriber identity modules may be configured to switch, to an idle state, a connected state of communication with a third node (e.g., a second master cell group (MCG) or a second master node (MN)) based on a second subscriber identity module not used for data communication, thereby enhancing the quality of communication with a first node (e.g., a first MCG or a first MN) based on the first subscriber identity module.

BRIEF DESCRIPTION OF DRAWINGS

The above and other aspects, features and advantages of certain embodiments will be more apparent from the following detailed description, taken in conjunction with the accompanying drawings, in which.

DETAILED DESCRIPTION

Hereinafter, various example embodiments are described in detail with reference to accompanying drawings.

Figure 1:
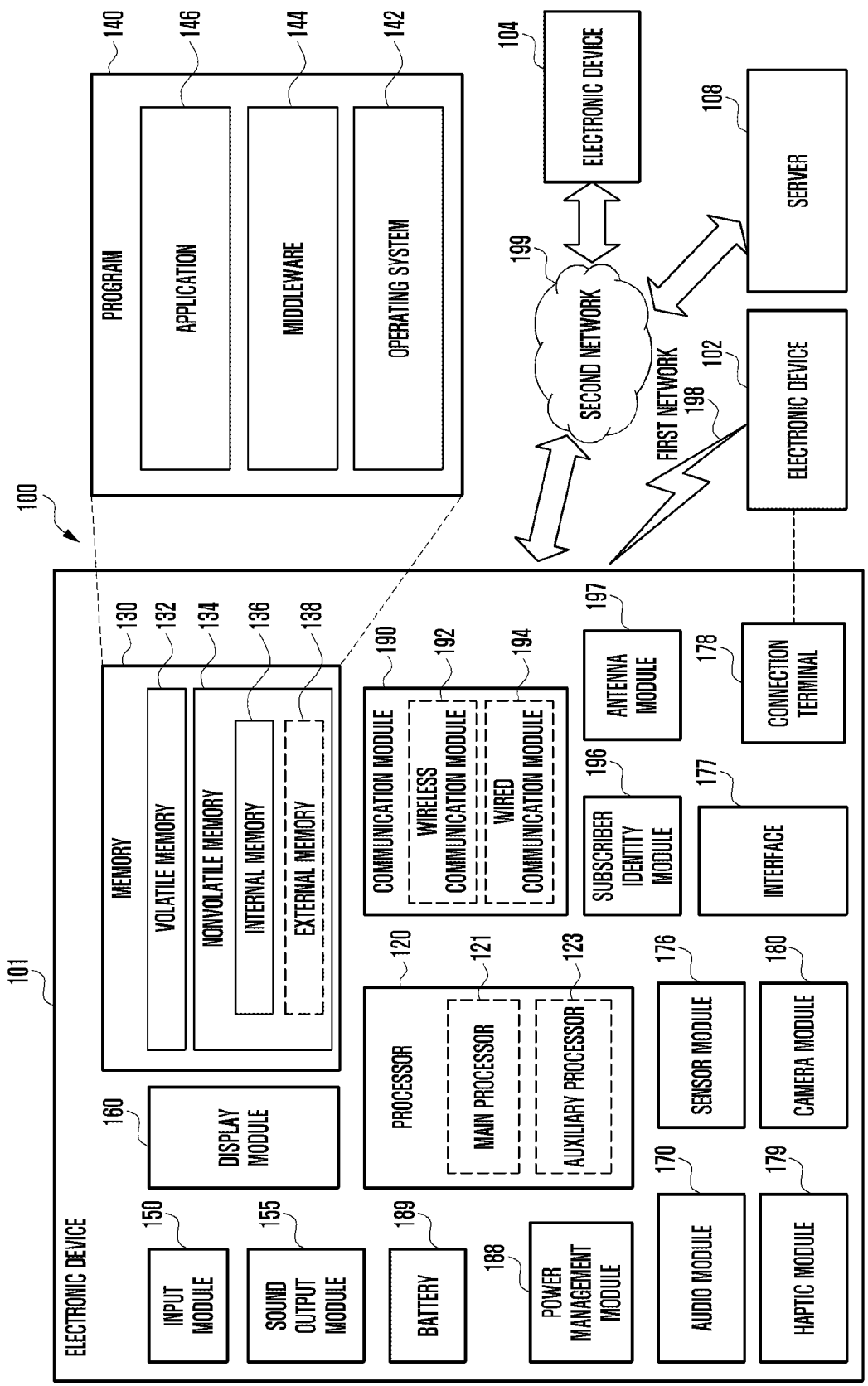
FIG. 1 is a block diagram illustrating an electronic device in a network environment according to various example embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via at least a third element(s).

As used in connection with various example embodiments, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
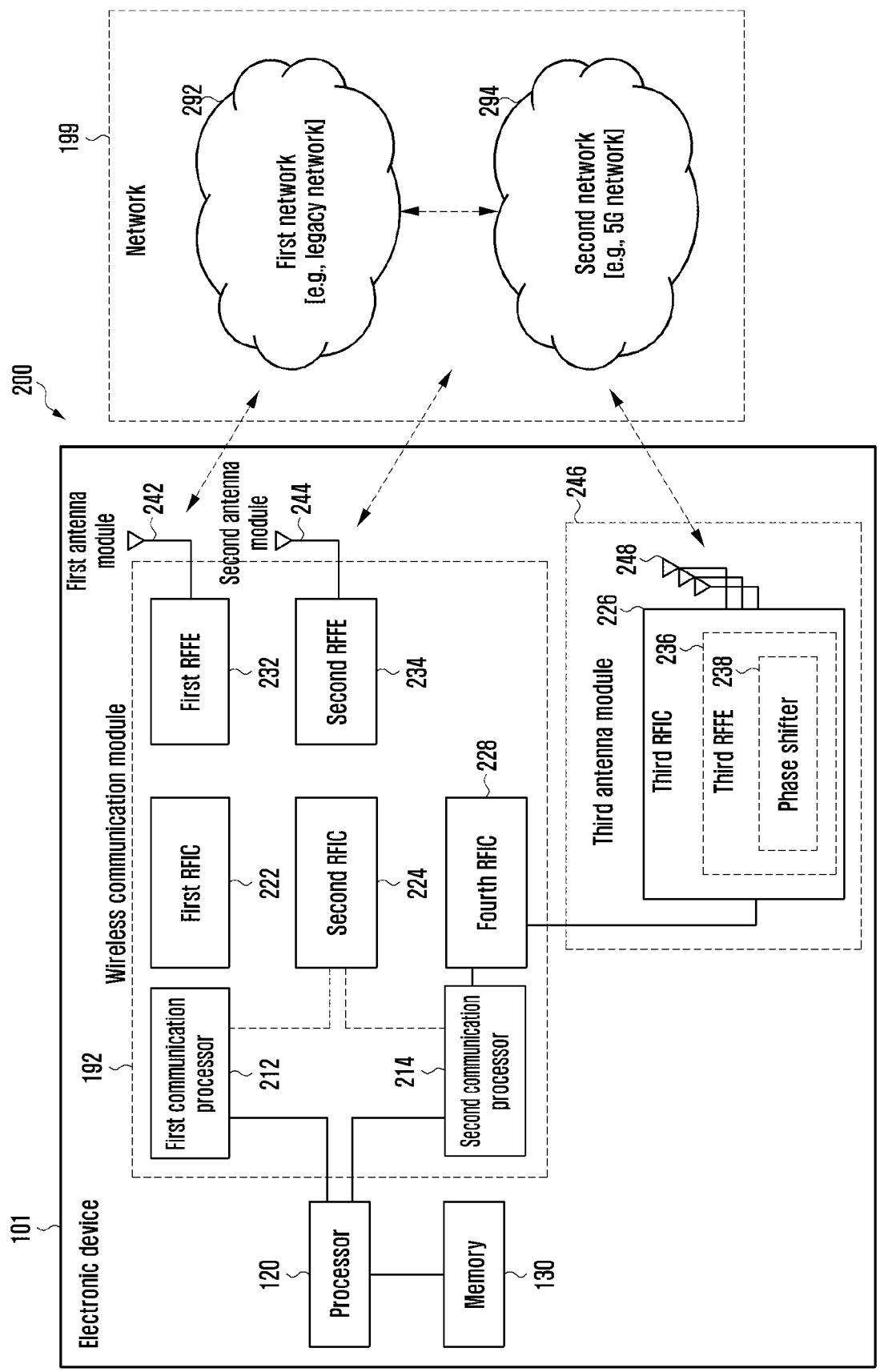
FIG. 2 is a block diagram of an electronic device for supporting 4G network communication and 5G network communication according to various example embodiments.

FIG. 2 is a block diagram 200 illustrating an example electronic device 101 supporting legacy network communication and 5G network communication according to various embodiments.

Referring to FIG. 2, according to various embodiments, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to an embodiment, the fourth RFIC 228 may be omitted, or may be included as a part of the third RFIC 226.

The first communication processor 212 may establish a communication channel of a band to be used for wireless communication with the first network 292, and may support legacy network communication via the established communication channel According to an embodiment, the first network 292 may be a legacy network including second generation (2G), third generation (3G), fourth generation (4G), or long-term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel According to an embodiment, the second network 294 may be a 5G network (e.g., new radio (NR)) defined in 3GPP. In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the sub-processor 123, or the communication module 190.

According to an embodiment, the first communication processor 212 may perform data transmission or reception with the second communication processor 214. For example, data which has been classified to be transmitted via the second network 294 may be changed to be transmitted via the first network 292.

In this instance, the first communication processor 212 may receive transmission data from the second communication processor 214. For example, the first communication processor 212 may perform data transmission or reception with the second communication processor 214 via an inter-processor interface. The inter-processor interface may be implemented as, for example, a universal asynchronous receiver/transmitter (UART) (e.g., a high speed-UART (HS-UART)) or a peripheral component interconnect bus express (PCIe), but the type of interface is not limited thereto. For example, the first communication processor 212 and the second communication processor 214 may exchange control information and packet data information using, for example, a shared memory. For example, the first communication processor 212 may perform transmission or reception of various types of information such as sensing information, information associated with an output strength, and resource block (RB) allocation information, with the second communication processor 214.

Depending on implementation, the first communication processor 212 may not be directly connected to the second communication processor 214. In this instance, the first communication processor 212 may perform data transmission or reception with the second communication processor 214, via the processor 120 (e.g., an application processor). For example, the first communication processor 212 and the second communication processor 214 may perform data transmission or reception via the processor 120 (e.g., an application processor) and a HS-UART interface or a PCIe interface, but the type of interface is not limited. For example, the first communication processor 212 and the second communication processor 214 may exchange control information and packet data information using the processor 120 (e.g., an application processor) and a shared memory. According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in apart (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3:
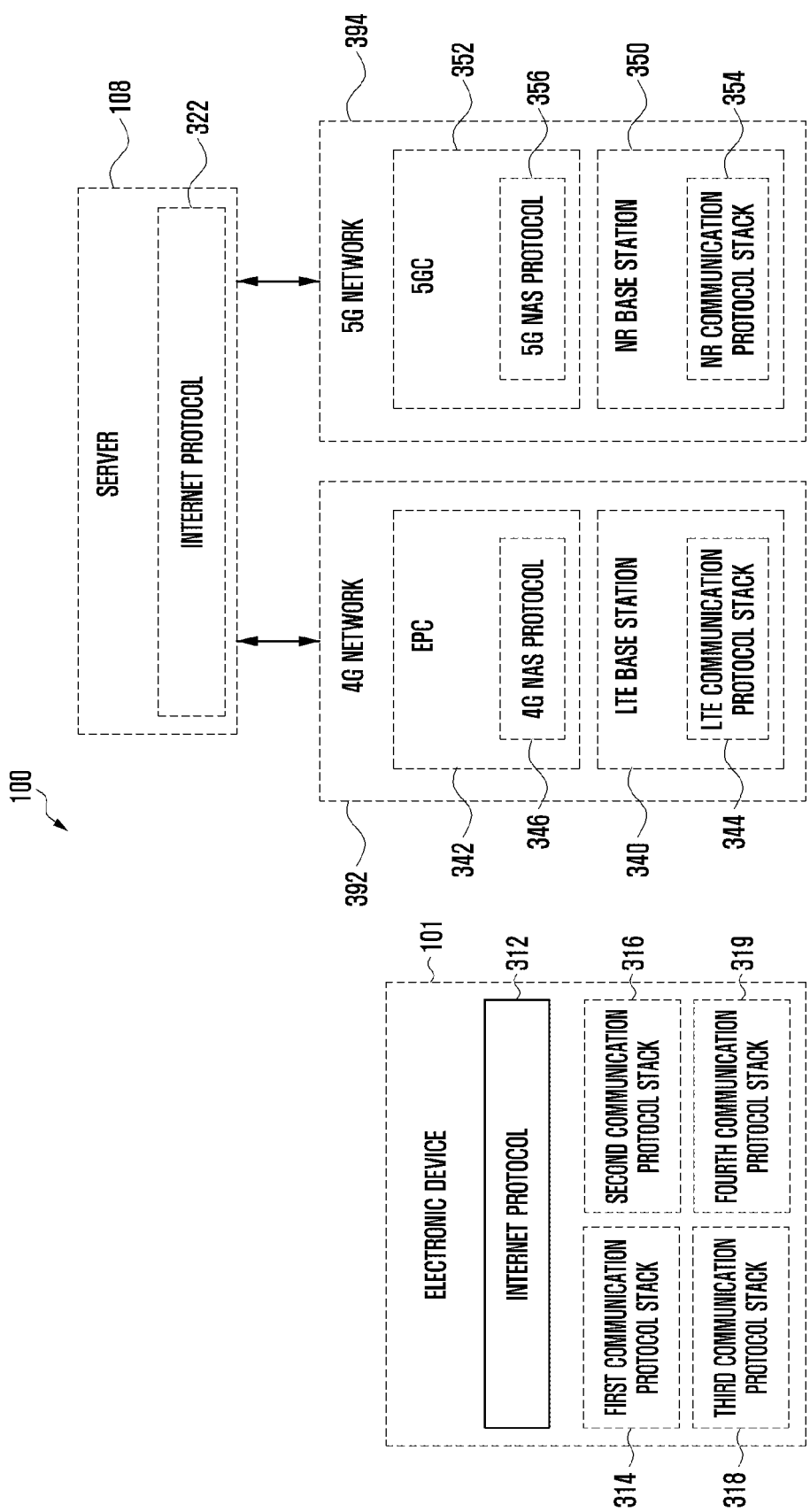
FIG. 3 illustrates a protocol stack structure of a network of 4G communication and/or 5G communication according to various example embodiments.

FIG. 3 illustrates a protocol stack structure of a network 100 of 4G communication and/or 5G communication according to various embodiments.

Referring to FIG. 3, according to various embodiments, the network 100 may include the electronic device 101, a 4G network 392, a 5G network 394, and the server 108.

According to various embodiments, the electronic device 101 may include an Internet protocol 312, a first communication protocol stack 314, a second communication protocol stack 316, a third communication protocol stack 318, and a fourth communication protocol stack 319. For example, the electronic device 101 may communicate with the server 108 via the 4G network 392 and/or 5G network 394.

According to an embodiment, the electronic device 101 may perform Internet communication associated with the server 108 by using the Internet protocol 312 (e.g., a transmission control protocol (TCP), a user datagram protocol (UDP), or an Internet protocol (IP)). For example, the Internet protocol 312 may be executed by a main processor (e.g., the main processor 121 of FIG. 1) included in the electronic device 101.

According to an embodiment, the electronic device 101 may perform wireless communication with the 4G network 392 by using the first communication protocol stack 314 and/or the third communication protocol stack 318. According to an embodiment, the electronic device 101 may perform wireless communication with the 5G network 394 by using the second communication protocol stack 316 and or the fourth communication protocol stack 319. For example, the first communication protocol stack 314, the second communication protocol stack 316, the third communication protocol stack 318, and the fourth communication protocol stack 319 may be executed by one or more communication processors (e.g., the wireless communication module 192 of FIG. 1) included in the electronic device 101.

According to various embodiments, the electronic device 101 may include multiple subscriber identity modules (e.g., a first subscriber identity module and a second subscriber identity module). According to an embodiment, the electronic device 101 may communicate with the 4G network 392 and/or 5G network 394, based on subscriber information (e.g., international mobile subscriber identification (IMSI)) stored in each of the multiple subscriber identity modules (e.g., a first subscriber identity module and a second subscriber identity module).

According to various embodiments, the electronic device 101 may perform wireless communication for a first subscriber identity module by using the first communication protocol stack 314 and/or the second communication protocol stack 316. According to an embodiment, the first communication protocol stack 314 may include various protocols for wireless communication with the 4G network 392. According to an embodiment, the second communication protocol stack 316 may include various protocols for wireless communication with the 5G network 394. According to an embodiment, the electronic device 101 may perform wireless communication with the 4G network 392 and/or the 5G network 394 by using the first communication protocol stack 314 and/or the second communication protocol stack 316 when performing communication by using the first subscriber identity module.

According to various embodiments, the electronic device 101 may perform wireless communication for a second subscriber identity module by using the third communication protocol stack 318 and/or the fourth communication protocol stack 319. According to an embodiment, the third communication protocol stack 318 may include various protocols for wireless communication with the 4G network 392. According to an embodiment, the fourth communication protocol stack 319 may include various protocols for wireless communication with the 5G network 394. According to an embodiment, the electronic device 101 may perform wireless communication with the 4G network 392 and/or the 5G network 394 by using the third communication protocol stack 318 and/or the fourth communication protocol stack 319 when performing communication by using the second subscriber identity module.

According to various embodiments, the server 108 may include an Internet protocol 322. The server 108 may perform transmission and/or reception of data related to the Internet protocol 322 with the electronic device 101 via the 4G network 392 and/or 5G network 394. According to an embodiment, the server 108 may include a cloud computing server existing outside the 4G network 392 or the 5G network 394. According to another embodiment, the server 108 may include an edge computing server (or a mobile edge computing (MEC) server) located inside at least one of the 4G network 392 or the 5G network 394.

According to various embodiments, the 4G network 392 may include a long-term evolution (LTE) base station 340 and an evolved packed core (EPC) 342. The LTE base station 340 may include an LTE communication protocol stack 344. The EPC 342 may include a 4G non-access stratum (NAS) protocol 346. The 4G network 392 may perform LTE wireless communication with the electronic device 101 by using the LTE communication protocol stack 344 and the 4G NAS protocol 346.

According to various embodiments, the 5G network 394 may include a new radio (NR) base station 350 and a 5th generation core (5GC) 352. The NR base station 350 may include an NR communication protocol stack 354. The 5GC 352 may include a 5G NAS protocol 356. The 5G network 394 may perform NR wireless communication with the electronic device 101 by using the NR communication protocol stack 354 and the 5G NAS protocol 356.

According to an embodiment, the first communication protocol stack 314, the second communication protocol stack 316, the third communication protocol stack 318, the fourth communication protocol stack 319, the LTE communication protocol stack 344, and the NR communication protocol stack 354 may include a control plane protocol for transmitting or receiving a control message, and a user plane protocol for transmitting or receiving user data. For example, the control message may include a message related to at least one of security control, bearer setup, authentication, registration, or mobility management. For example, the user data may include data remaining after excluding the control message.

According to an embodiment, the control plane protocol and the user plane protocol may include a physical (PHY) layer, a medium access control (MAC) layer, a radio link control (RLC) layer, or a packet data convergence protocol (PDCP) layer. For example, the PHY layer may perform channel coding and modulation of data received from a higher layer (e.g., the MAC layer), and transmit the same to a wireless channel, and may perform demodulation and decoding of data received via a wireless channel and transmit the same to a higher layer. The PHY layer included in the second communication protocol stack 316 and the NR communication protocol stack 354 may further perform an operation related to beamforming. For example, the MAC layer may logically/physically map data to a wireless channel to be transmitted or received, and may perform hybrid automatic repeat request (HARQ) for error correction. For example, the RLC layer may perform concatenation, segmentation, or reassembly of data, may identify the order of data, may perform reordering, and may perform redundancy checking. For example, the PDCP layer may perform an operation of ciphering control data and user data, and an operation related to data integrity. The second communication protocol stack 316 and the NR communication protocol stack 354 may further include a service data adaptation protocol (SDAP). For example, the SDAP may manage wireless bearer allocation based on the quality of service (QoS) of user data.

According to various embodiments, the control plane protocol may include a radio resource control (RRC) layer and a non-access stratum (NAS) layer. For example, the RRC layer may process control data related to radio bearer setup, paging, or mobility management. For example, the NAS may process a control message related to authentication, registration, and mobility management.

Figure 4A:
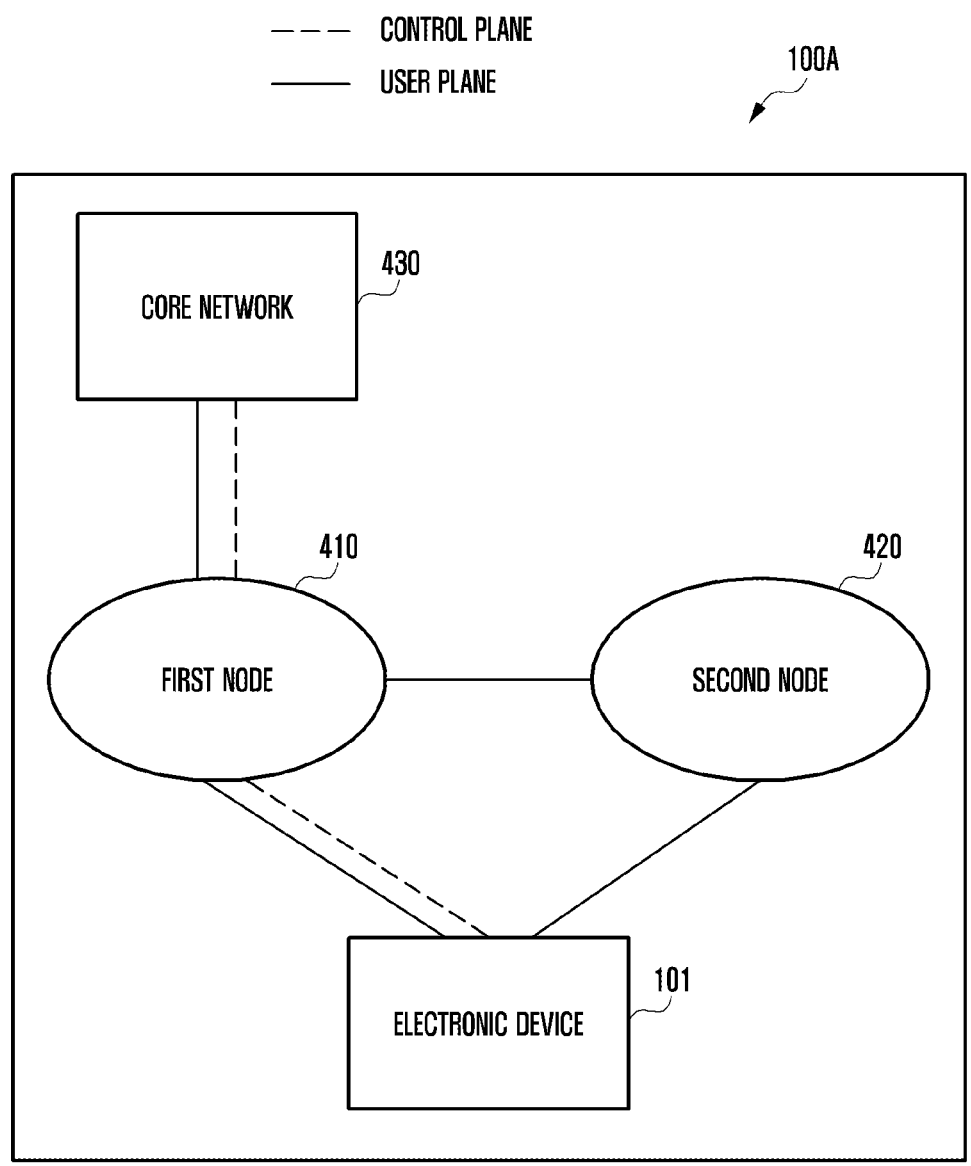
FIG. 4A is an example illustrating a wireless communication system providing a 4G communication and/or a 5G communication network according to various example embodiments.
Figure 4B:
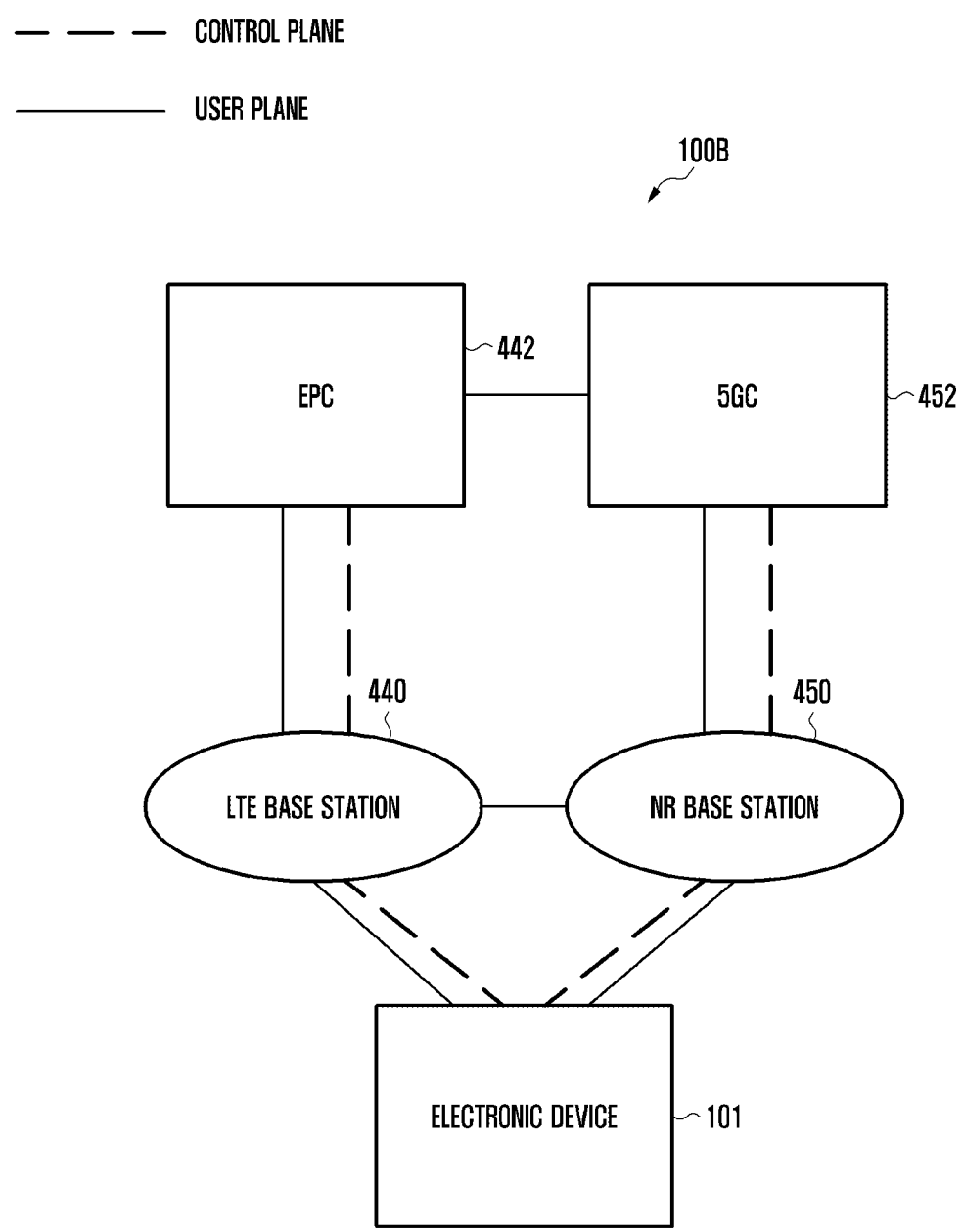
FIG. 4B is an example illustrating a wireless communication system providing a 4G communication and/or a 5G communication network according to various example embodiments.

FIGS. 4A and 4B are examples illustrating a wireless communication system providing a 4G communication and/or a 5G communication network according to various embodiments.

Referring to FIGS. 4A and 4B, according to various embodiments, a network environment 100A and/or 100B may include at least one of a 4G network and a 5G network. For example, the 4G network may include a 3GPP standard-based LTE base station 440 (e.g., eNodeB (eNB)) supporting radio access to the electronic device 101, and an evolved packet core (EPC) 442 managing 4G communication. For example, the 5G network may include a new radio (NR) base station (e.g., a gNodeB (gNB)) 450 supporting radio access to the electronic device 101 and a 5th generation core (5GC) 452 managing 5G communication of the electronic device 101.

According to various embodiments, the electronic device 101 may transmit and/or receive a control message and user data via 4G communication and/or 5G communication. For example, the control message may include a message related to at least one of security control, bearer setup, authentication, registration, or mobility management of the electronic device 101. For example, the user data may indicate user data remaining after excluding a control message transmitted and/or received between the electronic device 101 and a core network (e.g., the EPC 442 and/or the 5GC 452).

Referring to FIG. 4A, according to various embodiments, the electronic device 101 may perform transmission and/or reception of at least one of a control message and user data related to a second network (e.g., 5G network or 4G network) by using at least a part (e.g., the LTE base station 440 or the EPC 442) of a first network (e.g., 4G network or 5G network).

According to various embodiments, the network environment 100A may include a network environment in which a wireless communication dual connectivity (multi-radio access technology (RAT) dual connectivity (MR-DC)) to the LTE base station 440 and the NR base station 450 is provided (e.g., see FIG. 4B), and a control message is transmitted and/or received to and/or from the electronic device 101 via one core network 430 among the EPC 442 and the 5GC 452.

According to various embodiments, in the MR-DC environment, one of the LTE base station 440 or the NR base station 450 may operate as a first node (e.g., a master node (MN) or a cell of a master cell group (MCG)) 410, and the other may operate as a second node (e.g., a secondary cell group (SCG) or a secondary node (SN)) 420. According to an embedment, the first node 410 may be connected, directly or indirectly, to the core network 430, and may transmit and/or receive a control message. According to an embodiment, the first node 410 and the second node 420 are connected, directly or indirectly, via a network interface, and may perform transmission and/or reception of a message related to management of a radio resource (e.g., a communication channel).

According to an embodiment, the first mode 410 may include the LTE base station 440, the second node 420 may include the NR base station 450, and the core network 430 may include the EPC 442 (e.g., E-UTRA-NR dual connectivity (EN-DC)). For example, the electronic device 101 may transmit and/or receive a control message via the LTE base station 440, and transmit and/or receive user data via the LTE base station 440 and the NR base station 450.

According to an embodiment, the first node 410 may include the NR base station 450, the second node 420 may include the LTE base station 440, and the core network 430 may include the 5GC 452 (e.g., NR-E-UTRA dual connectivity (NE-DC)). For example, the electronic device 101 may transmit and/or receive a control message via the NR base station 450, and transmit and/or receive user data via the LTE base station 440 and/or the NR base station 450.

Referring to FIG. 4B, according to various embodiments, the 4G network and the 5G network 100B may independently transmit and/or receive data. For example, the electronic device 101 and the EPC 442 may transmit and/or receive a control message and/or user data via the LTE base station 440. For example, the electronic device 101 and the 5GC 452 may transmit and/or receive a control message and/or user data via the NR base station 450.

According to various embodiments, the electronic device 101 may be registered in at least one of the EPC 442 and the 5GC 452, and transmit and/or receive a control message.

According to various embodiments, the EPC 442 or the 5GC 452 may also manage communication of the electronic device 101 through interworking. For example, movement information of the electronic device 101 may be transmitted and/or received via an interface (e.g., N26 interface) between the EPC 442 and the 5GC 452.

Hereinafter, the electronic device 101 including multiple subscriber identity modules may support E-UTRA-NR dual connectivity (EN-DC) through each of the subscriber identity modules. For example, the EN-DC may include a state in which the electronic device 101 is connected (performs dual connectivity) to a first node (e.g., the first node 410 of FIG. 4A or the LTE base station 440 of FIG. 4B) of a 4G network (e.g., a first cellular network), and a second node (e.g., the second node 420 of FIG. 4A or the NR base station 450 of FIG. 4B) of a 5G network (e.g., a second cellular network). For example, the first node is a network element for transmitting and receiving a control message and/or data to and from the electronic device 101 during dual connectivity of the electronic device 101, based on first subscriber identity information included in a first subscriber identity module, and may indicate a master node (MN) or a cell of a master cell group (MCG). For example, the second node is a network element for transmitting and receiving data to and from the electronic device 101 during dual connectivity of the electronic device 101, based on first subscriber identity information included in a first subscriber identity module, and may indicate a secondary node (SN) or a cell of a secondary cell group (SCG). For example, the EN-DC may include an NR network having a non-stand alone (NSA) structure.

According to various embodiments, even in a case where another dual connectivity such as NR-E-UTRA dual connectivity (NE-DC) or NR-NR dual connectivity (NR-DC) is supported through each of the subscriber identity modules, the electronic device 101 may perform application (or operate) in the same manner as a case in which EN-DC is supported. For example, the NE-DC may include a state in which the electronic device 101 is connected, directly or indirectly, to the first node (e.g., the MN or the cell of the MCG) of the 5G network (e.g., the first cellular network) and the second node (e.g., the SN or the cell of the SCG) of the 4G network (e.g., the second cellular network) (e.g., a state in which the electronic device establishes dual connectivity). For example, the NR-DC may include a state in which the electronic device 101 is connected, directly or indirectly, to the first node (e.g., the MN or the cell of the MCG) supporting a first type (e.g., about 6 GHz or lower) of 5G network (e.g., the first cellular network) of and the second node (e.g., the SN or the cell of the SCG) supporting a second type (e.g., about 6 GHz or higher) of 5G network (e.g., the second cellular network) (e.g., a state in which the electronic device establishes dual connectivity).

Figure 5:
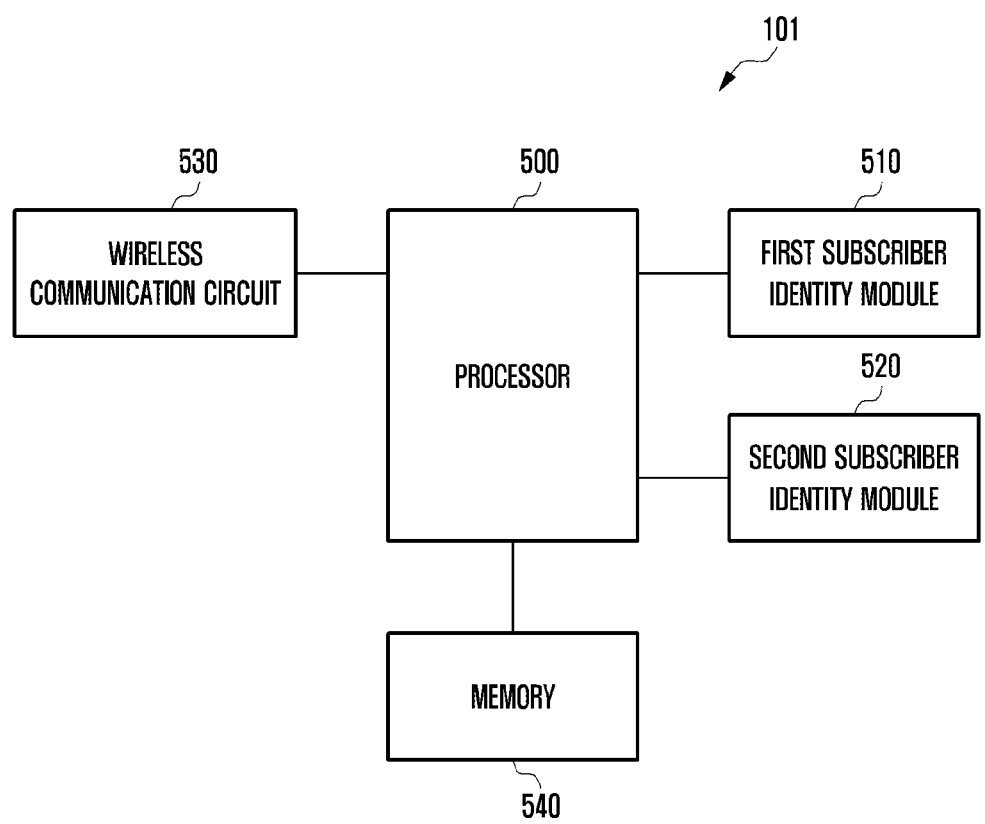
FIG. 5 is a block diagram illustrating an electronic device supporting multiple subscriber identity modules according to various example embodiments.

FIG. 5 is a block diagram illustrating an electronic device supporting multiple subscriber identity modules according to various embodiments.

Referring to FIG. 5, according to various embodiments, an electronic device 101 may include a processor 500, a first subscriber identity module (SIM) 510, a second subscriber identity module 520, a wireless communication circuit 530, and/or a memory 540. According to an embodiment, the processor 500 may be substantially identical to the processor 120 of FIG. 1, or may be included in the processor 120. The first subscriber identity module 510 and the second subscriber identity module 520 may be substantially identical to the subscriber identity module 196 of FIG. 1, or may be included in the subscriber identity module 196. The wireless communication circuit 530 may be substantially identical to the wireless communication module 192 of FIG. 1, or may be included in the wireless communication module 192. The memory 540 may be substantially identical to the memory 130 of FIG. 1, or may be included in the memory 130. According to an embodiment, the processor 500 may be operatively, functionally, and/or electrically connected, directly or indirectly, to the first subscriber identity module 510, the second subscriber identity module 520, the wireless communication circuit 530, and/or the memory 540. According to an embodiment, the electronic device 101 includes the first subscriber identity module 510 and the second subscriber identity module 520, but the disclosure is not limited thereto. The electronic device 101 may include multiple subscriber identity modules.

According to various embodiments, the subscriber identity modules 510 and 520 may store subscriber identity information (e.g., international mobile subscriber identity (IMSI)) for access, authentication, charging, and/or security of a wireless network. According to an embodiment, the first subscriber identity module 510 may store first subscriber identity information to be used for the electronic device 101 to access (or communicate with) a first cellular network and/or a second cellular network operated by a first mobile operator (or a first mobile carrier). For example, the first cellular network may include a first master cell group (MCG) network for transmitting and receiving a control message and/or data to and from the electronic device 101 during dual connectivity of the electronic device 101, based on the first subscriber identity information included in the first subscriber identity module 510. For example, the second cellular network may include a first secondary cell group (SCG) network for transmitting and receiving data to and from the electronic device 101 during dual connectivity of the electronic device 101, based on the first subscriber identity information included in the first subscriber identity module 510. For example, the first cellular network and/or the second cellular network may include at least one of a $2^{nd}$ generation (2G) network, a 3G network, a 4G network (e.g., long-term evolution (LTE)), or a 5G network (e.g., new radio (NR)). For example, when the electronic device 101 provides EN-DC, the first cellular network (e.g., the first MCG network) may include a 4G network, and the second cellular network (e.g., the first SCG network) may include a 5G network. For example, when the electronic device 101 provides NE-DC, the first cellular network (e.g., the first MCG network) may include a 5G network, and the second cellular network (e.g., the first SCG network) may include a 4G network. For example, when the electronic device 101 provides NR-DC, the first cellular network (e.g., the first MCG network) may include a first type (e.g., about 6 GHz or lower) of 5G network, and the second cellular network (e.g., the first SCG network) may include a second type (e.g., about 6 GHz or higher) of 5G network.

According to an embodiment, the second subscriber identity module 520 may store second subscriber identity information to be used for the electronic device 101 to access (or communication with) a third cellular network and/or a fourth cellular network operated by a second mobile operator (or a second mobile carrier). For example, the third cellular network may include a second MCG network for transmitting and receiving a control message and/or data to and from the electronic device 101 during dual connectivity of the electronic device 101, based on the second subscriber identity information included in the second subscriber identity module 520. For example, the fourth cellular network may include a second SCG network for transmitting and receiving data to and from the electronic device 101 during dual connectivity of the electronic device 101, based on the second subscriber identity information included in the second subscriber identity module 520. For example, the third cellular network and/or the fourth cellular network may include at least one of a $2^{nd}$ generation (2G) network, a 3G network, a 4G network (e.g., LTE), or a 5G network (NR). For example, the second mobile operator (or the second mobile carrier) may include the same mobile operator as, or a different mobile operator from the first mobile operator (or the first mobile carrier). For example, when the electronic device 101 provides EN-DC, the third cellular network (e.g., the second MCG network) may include a 4G network, and the fourth cellular network (e.g., the second SCG network) may include a 5G network. For example, when the electronic device 101 provides NE-DC, the third cellular network (e.g., the second MCG network) may include a 5G network, and the fourth cellular network (e.g., the second SCG network) may include a 4G network. For example, when the electronic device 101 provides NR-DC, the third cellular network (e.g., the second MCG network) may include a first type (e.g., about 6 GHz or lower) of 5G network, and the fourth cellular network (e.g., the second SCG network) may include a second type (e.g., about 6 GHz or higher) of 5G network.

According to various embodiments, the first subscriber identity module 510 and/or the second subscriber identity module 520 may be configured as a form of an integrated card (IC) card, and may be mounted on a slot of the electronic device 101. According to another embodiment, at least one of the first subscriber identity module 510 and/or the second subscriber identity module 520 may be configured as a form of an embedded SIM (eSIM) (or an embedded universal integrated circuit card (eUICC)) which is directly embedded in the electronic device 101. For example, when the first subscriber identity module 510 and/or the second subscriber identity module 520 is configured as a form of an eSIM, the electronic device 101 may store, in a security chip disposed on a circuit board of the electronic device 101, information related to the first subscriber identity module 510 and/or the second subscriber identity module 520 through remote SIM provisioning in the process of manufacturing the electronic device 101.

According to various embodiments, the processor 500 may control elements (e.g., the first subscriber identity module 510, the second subscriber identity module 520, the wireless communication circuit 530, and/or the memory 540) of the electronic device 101. According to an embodiment, the processor 500 may include an application processor (AP) (e.g., the main processor 121 of FIG. 1) and/or a communication processor (CP) (e.g., the auxiliary processor 123 of FIG. 1 or the communication module 190 of FIG. 1).

According to various embodiments, the processor 500 may control the wireless communication circuit 530 to perform communication with the first cellular network and/or the second cellular network, based on the first subscriber identity information stored in the first subscriber identity module 510. According to an embodiment, the processor 500 may control the wireless communication circuit 530 to perform wireless communication with the first cellular network and/or the second cellular network, based on the first subscriber identity information stored in the first subscriber identity module 510 through at least one protocol stack (e.g., the first communication protocol stack 314 and/or the second communication protocol stack 316 of FIG. 3) related to the first subscriber identity module 510. For example, the at least one communication protocol stack related to the first subscriber identity module 510 is a communication function supporting wireless communication related to the first subscriber identity module 510, and may be executed by the processor 500 (e.g., CP) for wireless communication based on the first subscriber identity information.

According to an embodiment, the processor 500 may control the wireless communication circuit 530 to access a first node (e.g., the first node 410 of FIG. 4A or the LTE base station 440 of FIG. 4B) of the first cellular network (e.g., the first LTE network) for an IP multimedia subsystem (IMS) service such as a call function. For example, the processor 500 may control the wireless communication circuit 530 to access a first node of the first cellular network (e.g., the first LTE network), based on a first IP allocated for the IMS service, through a first master cell group (MCG) protocol stack (e.g., the first communication protocol stack 314 of FIG. 3).

According to an embodiment, the processor 500 may control the wireless communication circuit 530 to access a first node of the first cellular network (e.g., the first LTE network) and a second node (e.g., the second node 420 of FIG. 4A or the NR base station 450 of FIG. 4B) of the second cellular network (e.g., the first NR network) for data communication when the first cellular network (e.g., the first LTE network) supports dual connectivity (e.g., EN-DC). For example, the processor 500 may control the wireless communication circuit 530 to access (perform dual connectivity to) a first node of the first cellular network (e.g., the first LTE network) and a second node (e.g., the second node 420 of FIG. 4A) of the second cellular network (e.g., the first NR network), based on a second IP allocated for data communication, through the first MCG protocol stack (e.g., the first communication protocol stack 314 of FIG. 3) and a first secondary cell group (SCG) protocol stack (e.g., the second communication protocol stack 316 of FIG. 3). For example, the first LTE network and the first NR network are networks operated by the first mobile operator (or the first mobile carrier), and may be included in a cellular network accessible by the electronic device 101, based on the first subscriber identity information of the first subscriber identity module 510. For example, during dual connectivity of the electronic device 101, the first node may indicate a first master node (MN) or a cell of a first master cell group (MCG), as a network element (e.g., a first base station) for transmitting and receiving a control message and/or data to and from the electronic device 101. For example, during dual connectivity of the electronic device 101, the second node may indicate a first secondary node (SN) or a cell of a first secondary cell group (SCG) network, as a network element (e.g., a second base station) for transmitting and receiving data to and from the electronic device 101. For example, the first MCG protocol stack is a communication function supporting wireless communication related to the first subscriber identity module 510, and may be executed by the processor 500 (e.g., CP) for wireless communication with the first node supporting the first cellular network, based on the first subscriber identity information. For example, the first SCG protocol stack is a communication function supporting wireless communication related to the first subscriber identity module 510, and may be executed by the processor 500 (e.g., CP) for wireless communication with the second node of the second cellular network, based on the first subscriber identity information.

According to various embodiments, the processor 500 may control the wireless communication circuit 530 to perform communication with the third cellular network and/or the fourth cellular network, based on the second subscriber identity information stored in the second subscriber identity module 520. According to an embodiment, the processor 500 may control the wireless communication circuit 530 to perform wireless communication with the third cellular network and/or the fourth cellular network, based on the second identity information stored in the second subscriber identity module 520, through at least one communication protocol stack (e.g., the third communication protocol stack 318 and/or the fourth communication protocol stack 319 of FIG. 3) related to the second subscriber identity module 520. For example, the at least one communication protocol stack related to the second subscriber identity module 520 is a communication function supporting wireless communication related to the second subscriber identity module 520, and may be executed by the processor 500 (e.g., CP) for wireless communication based on the second subscriber identity information.

According to an embodiment, the processor 500 may control the wireless communication circuit 530 to access a third node (e.g., the first node 410 of FIG. 4A or the LTE base station 440 of FIG. 4B) of the third cellular network (e.g., the second LTE network) for an IMS service such as a call function. For example, the processor 500 may control the wireless communication circuit 530 to access a third node of the third cellular network (e.g., the second LTE network), based on a third IP allocated for the IMS service, through a second MCG protocol stack (e.g., the third communication protocol stack 318 of FIG. 3). According to an embodiment, the processor 500 may control the wireless communication circuit 530 to access the third node of the third cellular network (e.g., the second LTE network) and a fourth node (e.g., the second node 420 of FIG. 4A or the NR base station 450 of FIG. 4B) of the fourth cellular network (e.g., the second NR network) for data communication when the third cellular network supports dual connectivity (e.g., EN-DC). For example, the processor 500 may control the wireless communication circuit 530 to access (e.g., perform dual connectivity) the third node of the third cellular network (e.g., the second LTE network) and the fourth node (e.g., the second node 420 of FIG. 4A) of the fourth cellular network (e.g., the second NR network), based on a fourth IP allocated for data communication, through the second MCG protocol stack (e.g., the third communication protocol stack 318 of FIG. 3) and a second SCG protocol stack (e.g., the fourth communication protocol stack 319 of FIG. 3). For example, the second LTE network and the second NR network are networks operated by the second mobile operator (or the second mobile carrier), and may be included in a cellular network accessible by the electronic device 101, based on the second subscriber identity information of the second subscriber identity module 520. For example, the second LTE network and/or the second NR network may be identical to or different from the first LTE network and/or the first NR network. For example, the third node is a network element (e.g., a third base station) for transmitting and receiving a control message and/or data to and from the electronic device 101 during dual connectivity of the electronic device 101, and may indicate a second MN or a cell of a second MCG. For example, the fourth node is a network element (e.g., a fourth base station) for transmitting and receiving data to and from the electronic device 101 during dual connectivity of the electronic device 101, and may indicate a second SN or a cell of a second SCG. For example, the second MCG protocol stack is a communication function supporting wireless communication related to the second subscriber identity module 520, and may be executed by the processor 500 (e.g., CP) for wireless communication with the third node supporting the third cellular network, based on the second subscriber identity information. For example, the second SCG protocol stack is a communication function supporting wireless communication related to the second subscriber identity module 520, and may be executed by the processor 500 (e.g., CP) for wireless communication with the fourth node supporting the fourth cellular network, based on the second subscriber identity information.

According to various embodiments, the processor 500 may control the wireless communication circuit 530 to provide an IMS server such as a call function (e.g., a voice call), based on the first subscriber identity information of the first subscriber identity module 510 and/or the second subscriber identity information of the second subscriber identity module 520. According to an embodiment, the processor 500 may control the wireless communication circuit 530 to provide an IMS service such as a call function through the first cellular network (e.g., the first LTE network) connected based on the first subscriber identity information stored in the first subscriber identity module 510 and/or the third cellular network (e.g., the second LTE network) connected based on the second subscriber identity information stored in the second subscriber identity module 520. For example, when providing a call function, based on the first subscriber identity information and the second subscriber identity information, the processor 500 may control the wireless communication circuit 530 to alternately provide a call function based on the first subscriber identity information of the first subscriber identity module 510 and a call function based on the second subscriber identity information of the second subscriber identity module 520, based on a designated time interval.

According to an embodiment, the processor 500 may control the wireless communication circuit 530 to perform data communication based on the first subscriber identity information of the first subscriber identity module 510 or the second subscriber identity information of the second subscriber identity module 520. According to an embodiment, when data communication based on the first subscriber identity module 510 is configured, the processor 500 may control the wireless communication circuit 530 to provide data communication through the first cellular network and/or the second cellular network, based on the first subscriber identity information stored in the first subscriber identity module 510. For example, the processor 500 may control the wireless communication circuit 530 to transmit and/or receive data through the first cellular network (e.g., the first LTE network) and/or the second cellular network (e.g., the first NR network) through dual connectivity (e.g., EN-DC) with the first cellular network (e.g., the first LTE network) and the second cellular network (e.g., the first NR network). For example, data communication may include Internet data communication. For example, a subscriber identity module for data communication may be configured (or selected) based on a user input, an application program executed in the electronic device 101, or a control signal received from an external device.

According to an embodiment, when data communication based on the first subscriber identity module 510 is configured, the processor 500 may maintain a DC support state of a UE capability related to the third cellular network and/or the fourth cellular network. For example, the UE capability may be transmitted to the third cellular network periodically, or at a time point of an access to the third cellular network (e.g., radio resource control (RRC) signaling). For example, the UE capability transmitted to the third cellular network may be configured so that the electronic device 101 supports DC.

According to an embodiment, when data communication based on the first subscriber identity module 510 is configured, the processor 500 may selectively restrict (or allow) a DC operation related to the third cellular network and/or the fourth cellular network, based on the state of communication between at least the electronic device 101 and the first cellular network. The processor 500 may selectively restrict (or allow) a DC operation related to the third cellular network and/or the fourth cellular network in a state in which the UE capability related to the third cellular network is configured to support DC. For example, when the state of communication between at least the electronic device 101 and the first cellular network (e.g., the first LTE network) is a connected state (e.g., an RRC-connected state), the processor 500 may restrict (or deactivate) the DC operation related to the third cellular network and/or the fourth cellular network. For example, when the state of communication between the electronic device 101 and the first cellular network (e.g., the first LTE network) is an idle state (e.g., an RRC idle state), the processor 500 may allow (or activate) the DC operation related to the third cellular network and/or the fourth cellular network. For example, the state of communication with the first cellular network (e.g., the first LTE network) is an RRC state between at least the electronic device 101 and the first cellular network, and may include an idle state (RRC idle state), a connected state (RRC-connected state), and/or an inactive state (RRC inactive state). For example, the DC operation related to the third cellular network and/or the fourth cellular network may include a series of operations of dual connectivity to the third cellular network (e.g., the second LTE network) and the fourth cellular network (e.g., the second NR network), based on the second subscriber identity information of the second subscriber identity module 520. For example, the DC operation related to the third cellular network and/or the fourth cellular network may include a series of operations of adding the fourth cellular network (e.g., the second NR network or the second SCG network) while being connected to the third cellular network (e.g., the second LTE network), based on the second subscriber identity information of the second subscriber identity module 520. For example, restricting the DC operation related to the third cellular network and/or the fourth cellular network may include a series of operations of restricting addition of the fourth cellular network (e.g., the second NR network or the second SCG network) while being connected to the third cellular network (e.g., the second LTE network), based on the second subscriber identity information of the second subscriber identity module 520, or releasing connection to the fourth cellular network. For example, allowing the DC operation related to the third cellular network and/or the fourth cellular network may include a series of operations of allowing addition of the fourth cellular network (e.g., the second NR network or the second SCG network) while being connected to the third cellular network (e.g., the second LTE network), based on the second subscriber identity information of the second subscriber identity module 520.

For example, when the state of communication between at least the electronic device 101 and the first cellular network (e.g., the first LTE network) is a connected state and DC is established through the first cellular network (e.g., the first LTE network), the processor 500 may restrict (or deactivate) the DC operation related to the third cellular network and/or the fourth cellular network. For example, the state in which DC is established through the first cellular network may include a state in which the electronic device 101 is connected to the first cellular network (e.g., the first LTE network) and the second cellular network (e.g., the first NR network), based on the first subscriber identity information of the first subscriber identity mode 510. For example, when the state of communication between the electronic device 101 and the first cellular network (e.g., the first LTE network) is an idle state (or an inactive state), or when DC is not established through the first cellular network (e.g., the first LTE network), the processor 500 may allow (or activate) the DC operation related to the third cellular network and/or the fourth cellular network. For example, the state in which DC is not established through the first cellular network may include a state in which the electronic device 101 is connected only to the first cellular network (e.g., the first LTE network), based on the first subscriber identity information of the first subscriber identity module 510.

For example, when a radio access technology (RAT) of the first subscriber identity module 510 (comprising circuitry) is configured as a network (e.g., the first LTE network) supporting DC (e.g., EN-DC), the state of communication between the electronic device 101 and the first cellular network is a connected state, and DC is established through the first cellular network, the processor 500 may restrict (or deactivate) the DC operation related to the third cellular network and/or the fourth cellular network. For example, when the RAT of the first subscriber identity module 510 is configured as a network not supporting DC, when the state of communication between the electronic device 101 and the first cellular network is an idle state (or an inactive state), or when DC is not established through the first cellular network, the processor 500 may allow (or activate) the DC operation related to the third cellular network and/or the fourth cellular network.

According to various embodiments, when restricting (or deactivating) the DC operation related to the third cellular network and/or the fourth cellular network, the processor 500 may restrict addition of the fourth cellular network (e.g., the second NR network). According to an embodiment, when a UE capability related to the third cellular network and/or the fourth cellular network is configured as a DC support state (e.g., EN-DC support state), the processor 500 may receive information related to measurement configuration related to the fourth cellular network from the third cellular network. When restricting (or deactivating) the DC operation related to the third cellular network and/or the fourth cellular network, the processor 500 may control the wireless communication circuit 530 not to perform a measurement operation related to the fourth cellular network (e.g., the second NR network). For example, the state in which the measurement operation related to the fourth cellular network (e.g., the second NR network) is not performed may include an operation of restricting a measurement operation related to the fourth cellular network (e.g., the second NR network) and/or an operation of restricting measurement reporting.

According to an embodiment, when the UE capability related to the third cellular network and/or the fourth cellular network is configured as a DC support state (e.g., EN-DC support state), the processor 500 may receive information related to a request for handover or cell addition (SCG add) related to the fourth network (e.g., the second NR network) from the third cellular network. For example, when receiving the measurement reporting related to a designated event (e.g., B1 event) from the electronic device 101, the third node of the third cellular network (e.g., the second LTE network) may transmit, to the electronic device 101, information related to the request for addition or handover for the fourth node (e.g., the cell of the second SCG) of the fourth cellular network (e.g., the second NR network). However, in a handover situation of the electronic device 101, when another cell disposed around the electronic device 101 is not identified or a wireless environment of a cell (e.g., the third node) to which the electronic device 101 is currently connected is not good, the third node of the third cellular network (e.g., the second LTE network) may transmit, to the electronic device 101, information related to the request for cell addition or handover for the fourth cellular network (e.g., the second NR network) even though measurement reporting related to a designated event is not received. For example, when restricting (or deactivating) the DC operation related to the third cellular network and/or the fourth cellular network, the processor 500 may control the wireless communication circuit 530 to transmit failure information (e.g., SCG failure information) corresponding to the request for cell addition or handover, to the third cellular network (e.g., the second LTE network).

According to various embodiments, when restricting (or deactivating) the DC operation related to the third cellular network and/or the fourth cellular network, the processor 500 may switch the state of communication with the third cellular network (e.g., the second LTE network) to an idle state (or inactive state). According to an embodiment, when a signal (e.g., a signal related to a voice call) related to an IMS service with the third cellular network (e.g., the second LTE network) has not been transmitted and/or received for a designated time (e.g., about 3 seconds) and execution of an application program related to the IMS service with the third cellular network (e.g., the second LTE network) ends, the processor 500 may switch the state of communication with the third cellular network (e.g., the second LTE network) to an idle state (e.g., an RRC idle state). For example, the processor 500 may control the wireless communication circuit 530 to switch the state of communication with the third cellular network (e.g., the second LTE network) to an idle state through TAU related to RRC connection re-establishment (RRE).

According to various embodiments, the wireless communication circuit 530 may receive a signal from an external device (e.g., the electronic device 101 of FIG. 1) through an antenna (e.g., the antenna module 197 of FIG. 1, comprising at least one antenna), or may transmit a signal to the external device. According to an embodiment, the wireless communication circuit 530 may include an RFIC (e.g., the first RFIC 222, the second RFIC 224, the third RFIC 236, and/or the fourth RFIC 228 of FIG. 2) and an RFFE (e.g., the first RFFE 232, the second RFFE 234, and/or the third RFFE 236 of FIG. 2) for communication with the external device. For example, elements of the wireless communication circuit 530 may be included in the same chip, or some of the elements may be included different chips. For example, the wireless communication circuit 530 may support communication with the external device by using the first cellular network (e.g., the first LTE network), the second cellular network (e.g., the first NR network), the third cellular network (e.g., the second LTE network), and the fourth cellular network (e.g., the second NR network).

According to various embodiments, the memory 540 may at least temporarily store various types of data used by at least one element (e.g., the processor 500 or the wireless communication circuit 530) of the electronic device 101. According to an embodiment, the memory 540 may store various instructions which can be executed through the processor 500.

Figure 6:
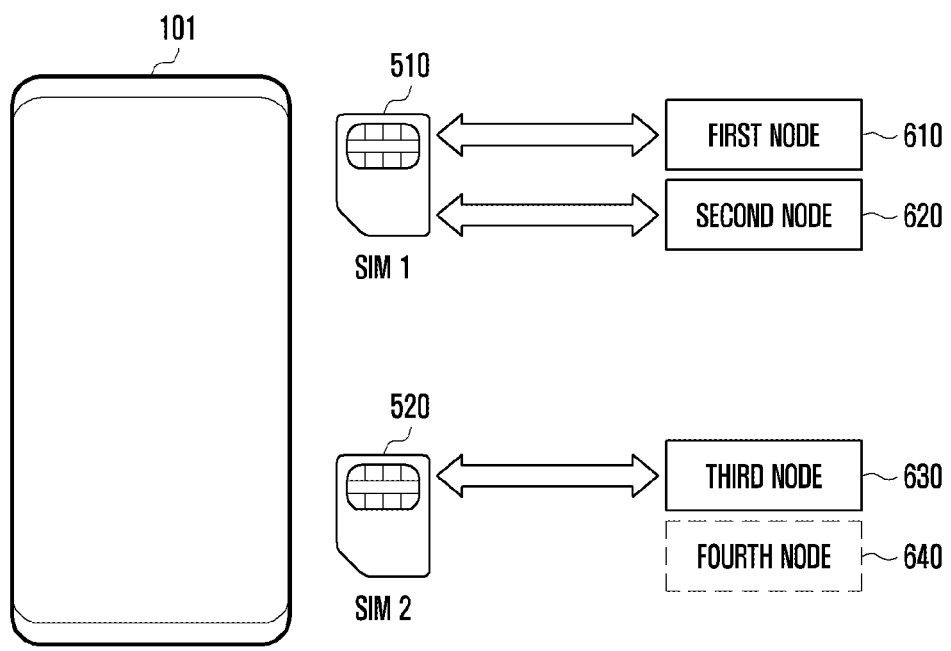
FIG. 6 is an example illustrating a connection with a cellular network in an electronic device according to various example embodiments.

FIG. 6 is an example illustrating a connection with a cellular network in an electronic device according to various embodiments.

Referring to FIG. 6, according to various embodiments, the electronic device 101 may perform data communication, based on subscriber identity information of one subscriber module 510 or 520 of the first subscriber identity module 510 (comprising circuitry) and the second subscriber identity module 520 (comprising circuitry). Hereinafter, it is assumed that the electronic device 101 performs data communication based on the first subscriber identity information of the first subscriber identity module 510.

According to various embodiments, the electronic device 101 may connect to a first cellular network (e.g., a first LTE network or a first MCG network), based on the first subscriber identity information included in the first subscriber identity module 510. The electronic device 101 may receive allocation of a first IP for an IMS service such as a voice call and a second IP for data communication through the first cellular network (e.g., the first LTE network). According to an embodiment, for the IMS service, the electronic device 101 may connect to a first node 610 (e.g., the LTE base station 440 of FIG. 4B) of the first cellular network (e.g., the first LTE network), based on the first IP. The electronic device 101 may perform a voice call function with an external electronic device through the first node 610.

According to an embodiment, when the first cellular network supports DC (e.g., EN-DC), the electronic device 101 may connect to (perform dual connectivity to) the first node 610 of the first cellular network (e.g., the first LTE network) and a second node 620 (e.g., the NR base station 450 of FIG. 4B) of the second cellular network (e.g., the first NR network or the first SCG network), based on the second IP for data communication. The electronic device 101 may transmit and/or receive data for data communication through the first node 610 and/or the second node 620.

According to various embodiments, the electronic device 101 may connect to the third cellular network (e.g., the second LTE network or the second MCG network), based on the second subscriber identity information included in the second subscriber identity module 520. According to an embodiment, when data communication based on the first subscriber identity module 510 is configured, the electronic device 101 may connect to a third mode 630 of the third cellular network (e.g., the second LTE network) for the IMS service, based on a third IP allocated from the third cellular network. The electronic device 101 may perform a voice call function with an external electronic device through the third node 630.

According to an embodiment, when the third cellular network supports DC, the electronic device 101 may maintain a DC support state of a UE capability related to the third cellular network. The electronic device 101 may selectively restrict (or allow) a DC operation related to the third cellular network and/or the fourth cellular network, based on a state of communication of the first cellular network (e.g., the first LTE network) in a state in which the UE capability related to the third cellular network is configured so that the electronic device 101 supports DC. For example, when the DC operation related to the third cellular network and/or the fourth cellular network is restricted, the electronic device 101 may restrict connection to a fourth node 640 of the fourth cellular network (e.g., the second NR network or the second SCG network) based on the second subscriber identity information. For example, the restricting of the connection to the fourth node 640 may include a series of operations of restricting a measurement operation related to the fourth node 640, or transmitting failure information in response to a request for handover or cell addition related to the fourth node 640. For example, when the DC operation related to the third cellular network and/or the fourth cellular network is allowed, the electronic device 101 may perform connection to the fourth node 640 of the fourth cellular network (e.g., the second NR network), based on the second subscriber identity information. For example, the electronic device 101 may additionally connect to the fourth node 640 of the fourth cellular network (e.g., the second NR network), based on the second subscriber identity information in a state in which the electronic device is connected to the third node 630 of the third cellular network, based on the second subscriber identity information.

According to various embodiments, an electronic device (e.g., the electronic device 101 of FIG. 1, 2, 3, 4A, 4B, or 5) may include a first subscriber identity module (e.g., the subscriber identity module 196 of FIG. 1 or the first subscriber identity module 510 of FIG. 5) including first subscriber identity information, a second subscriber identity module (e.g., the subscriber identity module 196 of FIG. 1 or the second subscriber identity module 520 of FIG. 5) including second subscriber identify information, a wireless communication circuit (e.g., the wireless communication module 192 of FIG. 1 or the wireless communication circuit 530 of FIG. 5), and at least one processor (e.g., the processor 120 of FIG. 1 or the processor 500 of FIG. 5) operatively connected to the first subscriber identity module, the second subscriber identity module, and the communication circuit, wherein the at least one processor connects to a first master cell group (MCG) network or the first MCG network and a first secondary cell group (SCG) network, based on the first subscriber identity information when data communication using the first subscriber identity information is configured, identifies a state of communication with the first MCG network, restricts addition of a second SCG network, based on the second subscriber identity information when the state of communication with the first MCG network is a connected state, and allows addition of the second SCG network, based on the second subscriber identity information when the state of communication with the first MCG network is in an idle state.

According to various embodiments, the at least one processor may maintain a dual connectivity (DC) support state of a UE capability related to a second MCG network connected based on the second subscriber identity information of the second SIM when the data communication using the first subscriber identity information included in the first SIM is configured.

According to various embodiments, the at least one processor restricts at least one of a measurement operation and a measurement report operation related to the second SCG network when measurement configuration is received from a second MCG network connected based on the second subscriber identity information of the second SIM in a state in which addition of the second SCG network is restricted.

According to various embodiments, the at least one processor may transmit, when a message related to a request for handover or cell addition of the second SCG network is received from a second MCG network connected based on the second subscriber identity information of the second SIM in a state in which addition of the second SCG network is restricted, a message related to failure in the request for cell addition or handover to the second MCG network through the wireless communication circuit.

According to various embodiments, the at least one processor may restrict addition of the second SCG network, based on the second subscriber identity information of the second SIM when the state of communication with the first MCG network connected based on the first subscriber identity information of the first SIM is a connected state, and DC is configured through the first MCG network.

According to various embodiments, the at least one processor may allow addition of the second SCG network, based on the second subscriber identity information of the second SIM when the state of communication with the first MCG network connected based on the first subscriber identity information of the first SIM is an idle state, or when the state of communication with the first MCG network is a connected state and DC is not configured through the first MCG network.

According to various embodiments, the at least one processor may restrict addition of the second SCG network, based on the second subscriber identity information of the second SIM when a radio access technology (RAT) of the first SIM is a network supporting DC, the state of communication with the first MCG based on the first subscriber identity information of the first SIM is a connected state, and DC is configured through the first MCG network.

According to various embodiments, the at least one processor may allow addition of the second SCG network, based on the second subscriber identity information of the second SIM when the RAT of the first SIM is a network not supporting DC, when the state of communication with the first MCG network based on the first subscriber identity information of the first SIM is an idle state, or when the state of communication with the first MCG network is a connected state and DC is not configured through the first MCG network.

According to various embodiments, the at least one processor may connect to the second SCG network through a second MCG network connected based on the second subscriber identity information when addition of the second SCG network, based on the second subscriber identity information of the second SIM, is allowed, and transmit information related to releasing of connection to the second SCG network to the second MCG network when the state of communication with the first MCG network connected based on the first subscriber identity information of the first SIM is switched to a connected state.

According to various embodiments, the at least one processor may identify whether a signal related to an IP multimedia subsystem (IMS) is transmitted and/or received through a second MCG network connected based on the second subscriber identity information of the second SIM when addition of the second SCG network, based on the second subscriber identity information, is restricted based on that the state of communication with the first MCG network is a connected state, and switch the state of communication with the second MCG network to an idle state when the signal related to the IMS has not been transmitted and/or received through the second MCG network for a designated time interval and execution of an application program related to the IMS ends.

Figure 7:
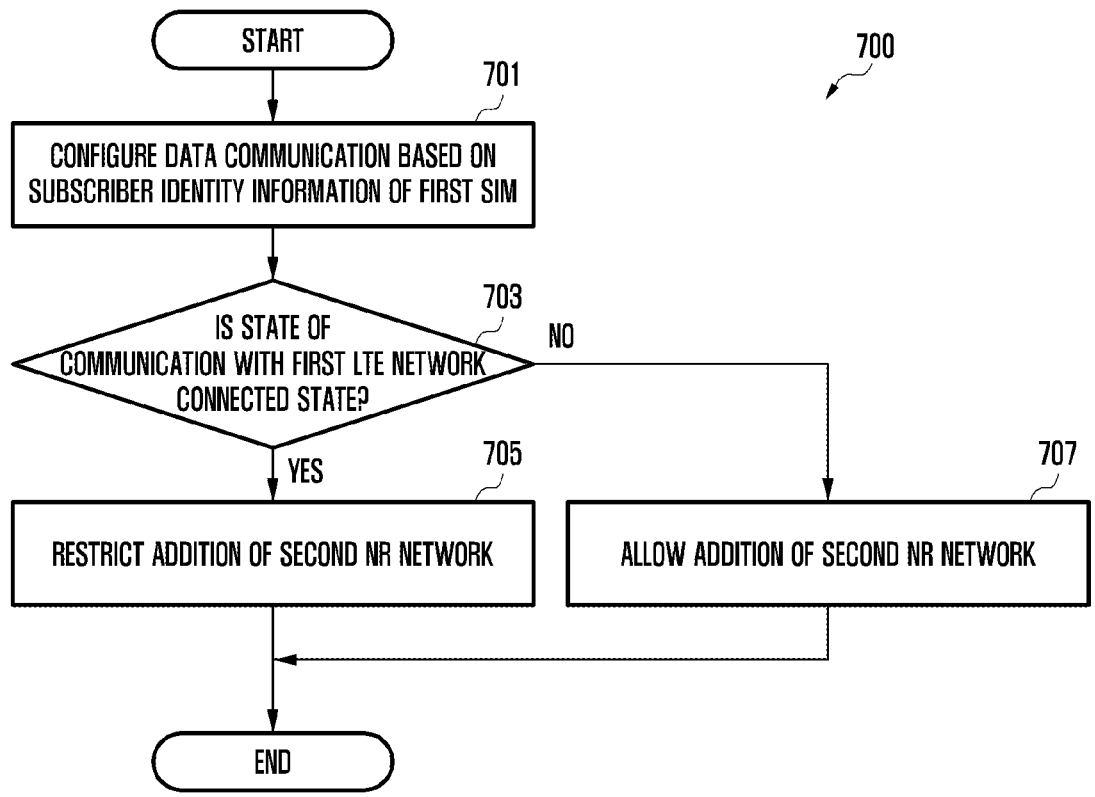
FIG. 7 is an example of a flow chart illustrating controlling of dual connectivity related to a second subscriber identity module in an electronic device according to various example embodiments.

FIG. 7 is an example of a flow chart 700 illustrating controlling of dual connectivity (DC) related to a second subscriber identity module in an electronic device according to various embodiments. Hereinafter, operations in the embodiment may be sequentially performed, but are not necessary to be sequentially performed. For example, orders of the operations may change, and at least two operations may be performed in parallel. For example, an electronic device of FIG. 7 may be the electronic device 101 of FIG. 1, 2, 3, 4A, 4B, and/or 5. For example, it may be assumed that the first subscriber identity module 510 and the second subscriber identity module 520 of the electronic device 101 support EN-DC. For example, it may be assumed that the first cellular network and the third cellular network support EN-DC.

Referring to FIG. 7, according to various embodiments, in operation 701, the electronic device 101 (e.g., the processor 120 of FIG. 1 or the processor 500 of FIG. 5) may configure data communication based on first subscriber identity information stored in the first subscriber identity module 510 among the first subscriber identity module 510 and the second subscriber identity module 520 included in the electronic device 101. For example, the first subscriber identity module 510 may be configured (or selected) as a subscriber identity module for data communication, based on a user input, an application program executed in the electronic device 101, or a control signal received from an external device. For example, the data communication may include Internet data communication. According to an embodiment, when data communication based on the first subscriber identity information is configured, the processor 500 may control the wireless communication circuit 530 to connect to the first LTE network (e.g., the first cellular network or the first MCG network) and/or the first NR network (e.g., the second cellular network or the first SCG network), based on the first subscriber identity information stored in the first subscriber identity module 510. For example, the connection to the first LTE network may include a series of operations of connecting to a first node (e.g., the first node 610 of FIG. 6) supporting the first LTE network, based on the first subscriber identity information. For example, the connection to the first NR network may include a series of operations of connecting to a second node (e.g., the second node 620 of FIG. 6) supporting the first NR network, based on the first subscriber identity information.

According to various embodiments, in operation 703, the electronic device 101 (e.g., the processor 120 or 500) may identify whether the state of communication with the first LTE network (e.g., the first cellular network or the first MCG network) connected based on the first subscriber identity information stored in the first subscriber identity module 510 is a connected state (e.g., RRC-connected state).

According to various embodiments, the state of communication with the first LTE network (e.g., the first cellular network or the first MCG network) is a connected state (e.g., "yes" in operation 703), the electronic device 101 (e.g., the processor 120 or 500) may restrict, in operation 705, addition of the second NR network (e.g., the fourth cellular network or the second SCG network) based on the second subscriber identity information of the second subscriber identity module 520. According to an embodiment, when data communication based on the first subscriber identity module 510 is configured, the processor 500 may maintain a DC support state of a UE capability related to the second LTE network (e.g., the third cellular network) connected based on the second subscriber identity information stored in the second subscriber identity module 520. The processor 500 may restrict a DC operation related to the second LTE network (e.g., the third cellular network) and/or the second NR network (e.g., the fourth cellular network), based on a connected state (e.g., RRC-connected) between the electronic device 101 and the first LTE network (e.g., the first cellular network) in a state in which the UE capability related to the second LTE network (e.g., the third cellular network) is configured to support DC. For example, the processor 500 may restrict addition of the second NR network (e.g., the fourth cellular network or the second SCG network) based on the second subscriber identity information to restrict (or deactivate) the DC operation based on the second subscriber identity information. For example, to restrict addition of the second NR network (e.g., the fourth cellular network), the processor 500 may restrict a measurement operation related to the second NR network (e.g., the fourth cellular network). For example, the processor 500 may control the wireless communication circuit 530 to transmit, to the second LTE network (e.g., the third cellular network), failure information (e.g., SCG failure information) in response to a request for addition or handover for a cell (e.g., the fourth node) of the second SCG network (e.g., the second NR network), received from the second LTE network (e.g., the third cellular network).

According to various embodiments, when the state of communication with the first LTE network (e.g., the first cellular network) is not a connected state (e.g., "no" in operation 703), the electronic device 101 (e.g., the processor 120 or 500) may allow, in operation 707, addition of the second NR network (e.g., the fourth cellular network or the second SCG network) based on the second subscriber identity information of the second subscriber identity module 520. According to an embodiment, when the state of communication between the electronic device 101 and the first LTE network (e.g., the first cellular network) is an idle state (e.g., RRC idle state), the processor 500 may determine that data communication based on the first subscriber identity information of the first subscriber identity module 510 is not performed. The processor 500 may control the wireless communication circuit 530 to perform data communication based on the second subscriber identity information of the second subscriber identity module 520 while data communication based on the first subscriber identity information of the first subscriber identity module 510 is not performed. When the second LTE network (e.g., the third cellular network) supports DC, the processor 500 may allow the DC operation related to the second subscriber identity information. For example, the processor 500 may control the wireless communication circuit 530 to perform a measurement operation related to the second NR network (e.g., the fourth cellular network) for addition of the second NR network (e.g., the fourth cellular network).

According various embodiments, the electronic device 101 (e.g., the processor 120 or 500) may determine, based on information acquired from a cellular network, whether the corresponding cellular network supports DC (e.g., EN-DC). According to an embodiment, the electronic device 101 may identify whether the first LTE network supports DC (e.g., EN-DC) from "upperLayerIndication-r15" of system information block (SIB) 2 received from the first LTE network (e.g., the first cellular network) (or the second LTE network (e.g., the third cellular network)). For example, when "upperLayerIndication-r15" of SIB 2 is configured as a first value (e.g., "true")), the electronic device 101 may determine that the first LTE network (or the second LTE network) to which the electronic device 101 is connected supports DC (e.g., EN-DC). That is, the electronic device 101 may determine that there is a first NR network (e.g., a second node) which is disposed adjacent to the electronic device 101 and to which the electronic device 101 can be connected.

According to an embodiment, the electronic device 101 may identify whether the first LTE network supports DC (e.g., EN-DC), based on a value of the "restrictDCNR bit" included in a connection acceptance (attach accept) message or a tracking area update (TAU) acceptance message acquired from the first LTE network in the process of connection (attachment) to the first LTE network (e.g., the first cellular network) (or the second LTE network (e.g., the third cellular network)). For example, when the "restrictDCNR bit" is configured as "use of dual connectivity with NR is restricted", the electronic device 101 may determine that the first LTE network (e.g., the second LTE network) does not support DC (e.g., EN-DC).

According to an embodiment, the electronic device 101 may identify whether the first LTE network supports DC (e.g., EN-DC), based on whether "NR-config-r15" or "NR-radiobearerConfig-r15" is included in an RRC connection reconfiguration message received from the first LTE network (e.g., the first cellular network) (or the second LTE network (e.g., the third cellular network)).

According to various embodiments, when NE-DC is supported, the electronic device 101 (e.g., the processor 120 or 500) may selectively restrict addition of the second LTE network (e.g., the fourth cellular network or the second SCG network) based on the second subscriber identity information of the second subscriber identity module 520, based on the state of communication with the first NR network (e.g., the first cellular network or the first MCG network). According to an embodiment, the processor 500 may restrict a DC operation related to the second subscriber identity information, based on a connected state (e.g., RRC connected) between the electronic device 101 and the first NR network (e.g., the first cellular network) in a state in which the UE capability related to the second NR network (e.g., the third cellular network) is configured to support DC. For example, the processor 500 may restrict addition of the second LTE network (e.g., the fourth cellular network or the second SCG network) in a state in which connection to the second NR network (e.g., the third cellular network or the second MCG network) is made based on the second subscriber identity information.

According to various embodiments, when NR-DC is supported, the electronic device 101 (e.g., the processor 120 or 500) may selectively restrict addition of a second type (e.g., about 6 GHz or higher) of second NR network (e.g., the fourth cellular network or the second SCG network) based on the second subscriber identity information of the second subscriber identity module 520, based on the state of communication with a first type (e.g., about 6 GHz or lower) of first NR network (e.g., the first cellular network or the first MCG network). According to an embodiment, the processor 500 may restrict the DC operation related to the second subscriber identity information, based on a connected state (e.g., RRC-connected) between the electronic device 101 and the first type (e.g., about 6 GHz or lower) of first NR network (e.g., the first cellular network) in a state in which the UE capability related to the first type (e.g., about 6 GHz or lower) of second NR network (e.g., the third cellular network) is configured to support DC. For example, the processor 500 may restrict addition of the second type (e.g., about 6 GHz or higher) of second NR network (e.g., the fourth cellular network or the second SCG network) in a state in which connection is made to the first type (e.g., about 6 GHz or lower) of second NR network (e.g., the third cellular network or the second MCG network), based on the second subscriber identity information.

According to various embodiments, the electronic device 101 (e.g., the processor 120 or 500) may restrict addition of the fourth cellular network (e.g., the second SCG network) based on the second subscriber identity information, regardless of the type of the first cellular network when the state of communication with the first cellular network (e.g., the first MCG network) connected based on the first subscriber identify information of the first subscriber identity module 510 is a connected state.

According to various embodiments, when a subscriber identity module for data communication is not configured in a state in which the first subscriber identity module 510 and the second subscriber identity module 520 are activated, the electronic device 101 (e.g., the processor 120 or 500) may assume that data communication is performed based on the subscriber identity module (e.g., first subscriber identity module 510) selected based on a designated scheme. For example, the subscriber identity module for data communication may be randomly selected. For example, the subscriber identity module for data communication may be selected based on a configuration history related to data communication. For example, the configuration history related to data communication may include information of a subscriber identity module configured for data communication at a previous time point. According to an embodiment, the electronic device 101 (e.g., the processor 120 or 500) may selectively restrict (or allow), based on the state of communication of a subscriber identity module selected in the designated scheme, a DC operation related to a subscriber identity module not selected in the designated scheme.

Figure 8:
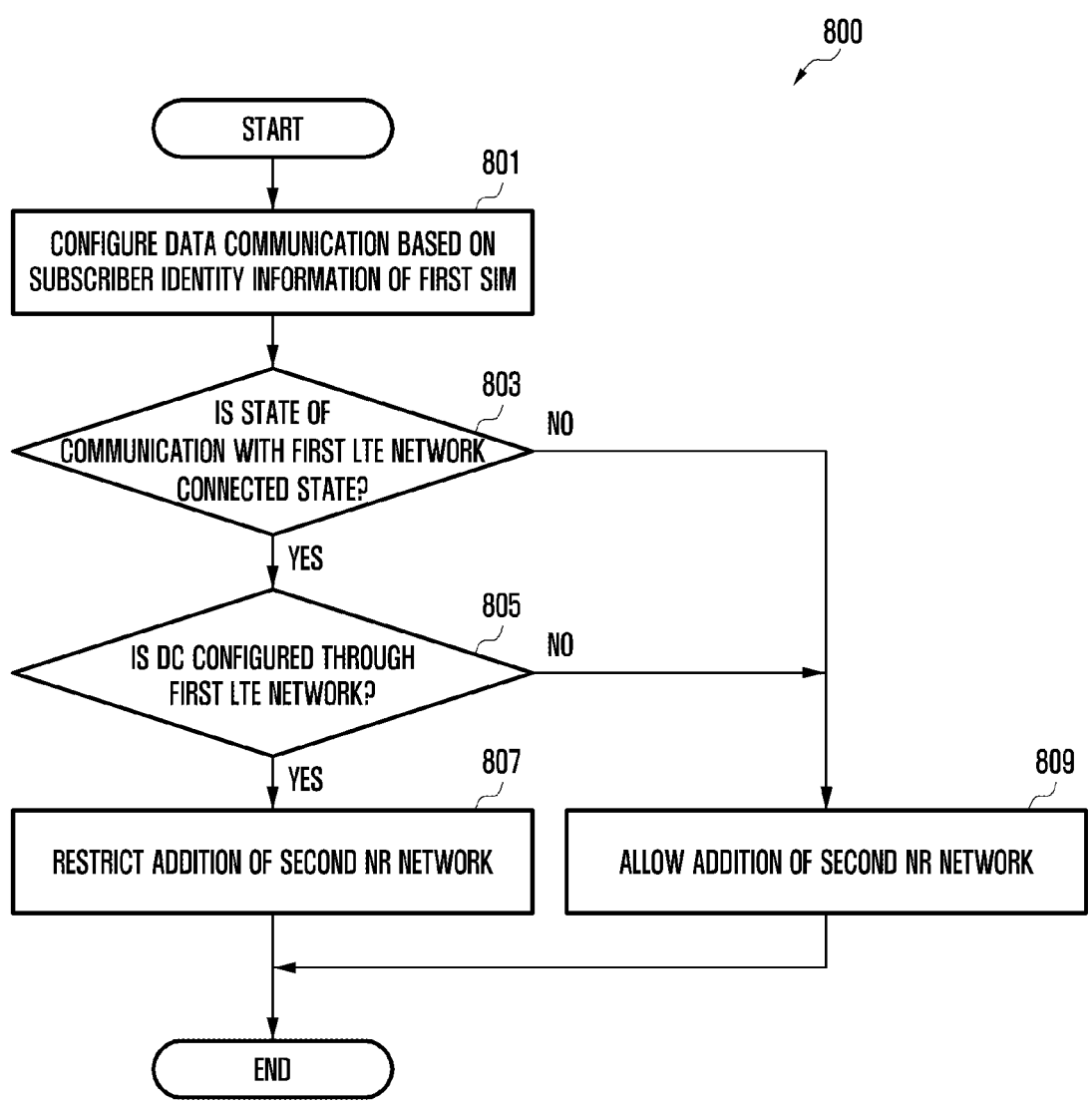
FIG. 8 is an example of a flow chart illustrating controlling of dual connectivity related to a second subscriber identity module in an electronic device according to various example embodiments.

FIG. 8 is an example of a flow chart 800 illustrating controlling of dual connectivity related to a second subscriber identity module in an electronic device according to various embodiments. Hereinafter, operations may be sequentially performed, but are not necessary to be sequentially performed. For example, orders of the operations may change, and at least two operations may be performed in parallel. For example, an electronic device of FIG. 8 may be the electronic device 101 of FIG. 1, 2, 3, 4A, 4B, and/or 5. For example, it may be assumed that the first subscriber identity module 510 and the second subscriber identity module 520 of the electronic device 101 support EN-DC. For example, it may be assumed that the first cellular network and the third cellular network support EN-DC.

Referring to FIG. 8, according to various embodiments, in operation 801, the electronic device 101 (e.g., the processor 120 of FIG. 1 or the processor 500 of FIG. 5) may configure data communication based on first subscriber identity information stored in the first subscriber identity module 510 among the first subscriber identity module 510 and the second subscriber identity module 520 included in the electronic device 101. For example, the data communication based on the first subscriber identity module 510 may be configured (or selected) based on a user input, an application program executed in the electronic device 101, or a control signal received from an external device. According to an embodiment, when data communication based on the first subscriber identity information is configured, the processor 500 may control the wireless communication circuit 530 to connect to the first LTE network (e.g., the first cellular network) and/or the first NR network (e.g., the second cellular network), based on the first subscriber identity information stored in the first subscriber identity module 510.

According to various embodiments, in operation 803, the electronic device 101 (e.g., the processor 120 or 500) may identify whether the state of communication with the first LTE network (e.g., the first cellular network or the first MCG network) connected based on the first subscriber identity information stored in the first subscriber identity module 510 is a connected state (e.g., RRC-connected state).

According to various embodiments, when the state of communication with the first LTE network (e.g., the first cellular network) is a connected state (e.g., "yes" in operation 803), the electronic device 101 (e.g., the processor 120 or 500) may identify, in operation 805, whether DC (e.g., EN-DC) is configured with the first LTE network (e.g., the first cellular network). According an embodiment, when the electronic device 101 is connected to the first LTE network (e.g., the first node 610) and the first NR network (e.g., the second node 620) for data communication, based on the first subscriber identity information, the processor 500 may determine that DC (e.g., EN-DC) is configured with the first LTE network (e.g., the first cellular network). According to an embodiment, when the electronic device 101 is connected only to the first LTE network (e.g., the first node 610) (or the first NR network (e.g., the second node 620)) for data communication, based on the first subscriber identity information, the processor 500 may determine that DC (e.g., EN-DC) is not configured with the first LTE network (e.g., the first cellular network).

According to various embodiments, when DC (e.g., EN-DC) is configured with the first LTE network (e.g., the first cellular network) (e.g., "yes" in operation 805), the electronic device 101 (e.g., the processor 120 or 500) may restrict, in operation 807, addition of the second NR network (e.g., the fourth cellular network or the second SCG network) based on the second subscriber identity information of the second subscriber identity module 520. According to an embodiment, when data communication based on the first subscriber identity module 510 is configured, the processor 500 may maintain a DC support state of a UE capability related to the second LTE network (e.g., the third cellular network) connected based on the second subscriber identity information stored in the second subscriber identity module 520. The processor 500 may restrict a DC operation based on the second subscriber identity information when DC is configured with the first LTE network (e.g., the first cellular network) in a connected state (e.g., RRC-connected state) while the UE capability related to the second LTE network (e.g., the third cellular network) is configured to support DC. For example, the restricting (deactivating) of the DC operation based on the second subscriber identity information may include a series of operations of restricting addition of the second NR network (e.g., the fourth cellular network or the second SCG network) in a state in which the electronic device 101 is connected to the second LTE network (e.g., the third cellular network or the second MCG network), based on the second subscriber identity information.

According to various embodiments, when the state of communication with the first LTE network (e.g., the first cellular network) is not a connected state (e.g., "no" in operation 803) or DC (e.g., EN-DC) is not configured with the first LTE network (e.g., the first cellular network) (e.g., "no" in operation 805), the electronic device 101 (e.g., the processor 120 or 500) may allow, in operation 809, addition of the second NR network (e.g., the fourth cellular network or the second SCG network) based on the second subscriber identity information of the second subscriber identity module 520. According to an embodiment, when the state of communication between the electronic device 101 and the first LTE network (e.g., the first cellular network) is an idle state (e.g., RRC idle state) or DC is not configured with the first LTE network (e.g., the first cellular network) in a connected state (e.g., RRC-connected state), the processor 500 may determine that data communication based on the first subscriber identity module 510 is not performed. The processor 500 may control the wireless communication circuit 530 to perform data communication based on the second subscriber identity information of the second subscriber identity module 520 while data communication based on the first subscriber identity information of the first subscriber identity module 510 is not performed. When the second LTE network (e.g., the third cellular network) to which the electronic device 101 is connected based on the second subscriber identity information supports DC, the processor 500 may allow addition of the second NR network (e.g., the fourth cellular network).

According to various embodiments, when NE-DC is supported, the electronic device 101 (e.g., the processor 120 or 500) may selectively restrict addition of the second LTE network (e.g., the fourth cellular network) based on the second subscriber identity information of the second subscriber identity module 520, based on the state of communication with the first NR network (e.g., the first cellular network or the first MCG network) and whether DC is configured with the first NR network. According to an embodiment, the processor 500 may restrict a DC operation related to the second subscriber identity information when the state of communication between the electronic device 101 and the first NR network (e.g., the first cellular network) is a connected state (e.g., RRC connected) and DC is configured with the first NR network in a state in which the UE capability related to the second NR network (e.g., the third cellular network) is configured to support DC. For example, the processor 500 may restrict addition of the second LTE network (e.g., the fourth cellular network or the second SCG network) in a state in which connection to the second NR network (e.g., the third cellular network or the second MCG network) is made based on the second subscriber identity information.

According to various embodiments, when NR-DC is supported, the electronic device 101 (e.g., the processor 120 or 500) may selectively restrict addition of a second type (e.g., about 6 GHz or higher) of second NR network (e.g., the fourth cellular network) based on the second subscriber identity information of the second subscriber identity module 520, based on the state of communication with a first type (e.g., about 6 GHz or lower) of first NR network (e.g., the first cellular network or the first MCG network) and whether DC is configured with the first type of first NR network. According to an embodiment, the processor 500 may restrict the DC operation related to the second subscriber identity information when the state of communication between the electronic device 101 and the first type (e.g., about 6 GHz or lower) of first NR network (e.g., the first cellular network) is a connected state (e.g., RRC connected) and DC is configured with the first type of first NR network in a state in which the UE capability related to the first type (e.g., about 6 GHz or lower) of second NR network (e.g., the third cellular network) is configured to support DC. For example, the processor 500 may restrict addition of the second type (e.g., about 6 GHz or higher) of second NR network (e.g., the fourth cellular network or the second SCG network) in a state in which connection is made to the first type (e.g., about 6 GHz or lower) of second NR network (e.g., the third cellular network or the second MCG network), based on the second subscriber identity information.

Figure 9:
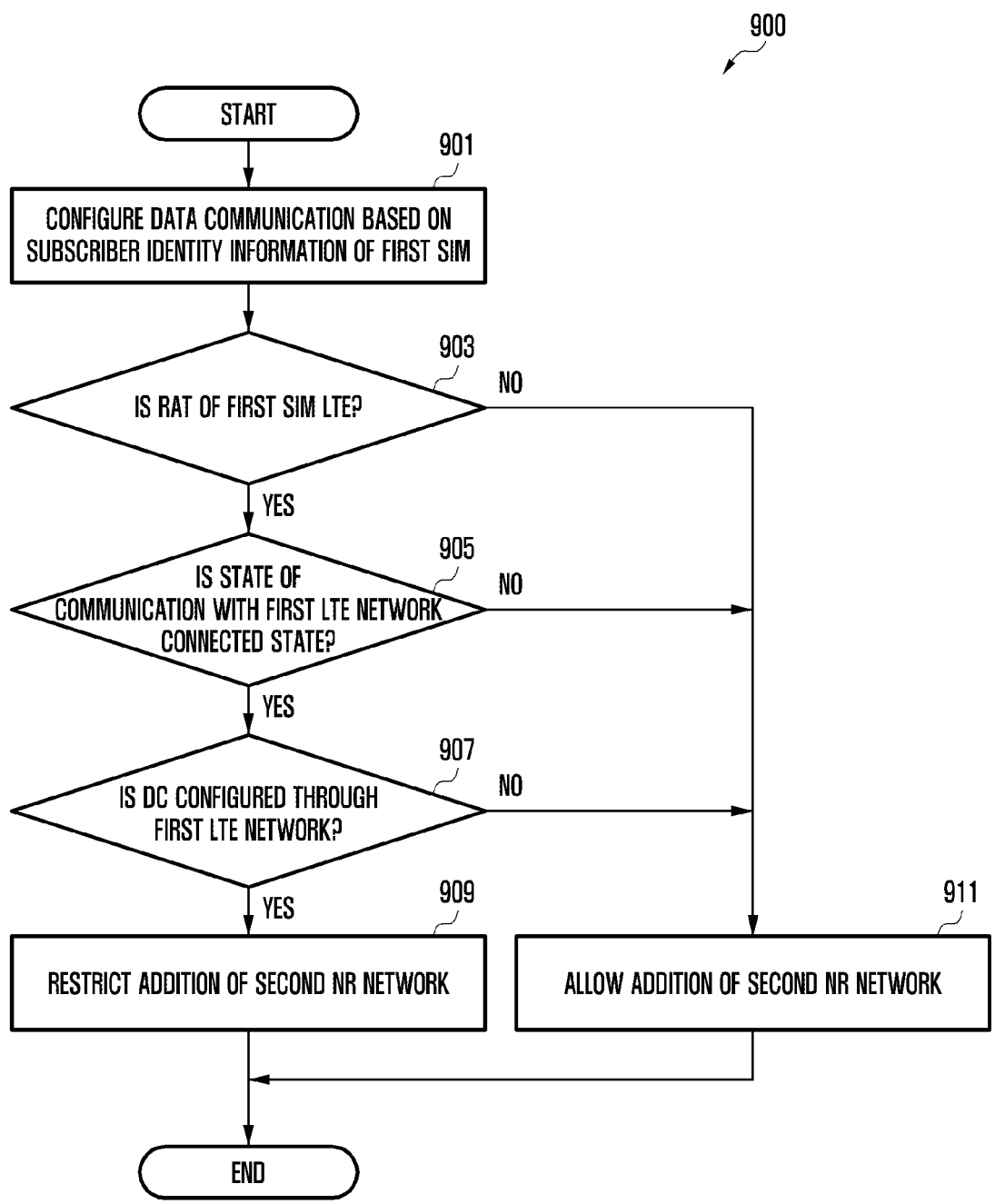
FIG. 9 is an example of a flow chart illustrating controlling of dual connectivity related to a second subscriber identity module in an electronic device according to various example embodiments.

FIG. 9 is an example of a flow chart 900 illustrating controlling of dual connectivity (DC) related to a second subscriber identity module in an electronic device according to various embodiments. Hereinafter, operations in the embodiment may be sequentially performed, but are not necessary to be sequentially performed. For example, orders of the operations may change, and at least two operations may be performed in parallel. For example, an electronic device of FIG. 9 may be the electronic device 101 of FIG. 1, 2, 3, 4A, 4B, and/or 5. For example, it may be assumed that the first subscriber identity module 510 and the second subscriber identity module 520 of the electronic device 101 support EN-DC. For example, it may be assumed that the first cellular network and the third cellular network support EN-DC.

Referring to FIG. 9, according to various embodiments, in operation 901, the electronic device 101 (e.g., the processor 120 of FIG. 1 or the processor 500 of FIG. 5) may configure data communication based on first subscriber identity information stored in the first subscriber identity module 510 among the first subscriber identity module 510 and the second subscriber identity module 520 included in the electronic device 101. For example, the data communication based on the first subscriber identity module 510 may be configured (or selected) based on a user input, an application program executed in the electronic device 101, or a control signal received from an external device. According to an embodiment, when data communication based on the first subscriber identity information is configured, the processor 500 may control the wireless communication circuit 530 to connect to the first LTE network (e.g., the first cellular network) and/or the first NR network (e.g., the second cellular network), based on the first subscriber identity information stored in the first subscriber identity module 510.

According to various embodiments, in operation 903, the electronic device 101 (e.g., the processor 120 or 500) may identify whether an RAT related to the first subscriber identity module 510 is an LTE network. According to an embodiment, the processor 500 may identify whether the electronic device 101 is connected to a network (e.g., the first LTE network) supporting DC, based on the first subscriber identity information stored in the first subscriber identity module 510.

According to various embodiments, when the RAT related to the first subscriber identity module 510 is an LTE network (e.g., the first LTE network) (e.g., "yes" in operation 903), the electronic device 101 (e.g., the processor 120 or 500) may identify, in operation 905, whether the state of communication with the first LTE network (e.g., the first cellular network) is a connected state (e.g., RRC-connected state).

According to various embodiments, when the state of communication with the first LTE network (e.g., the first cellular network or the first MCG network) is a connected state (e.g., "yes" in operation 905), the electronic device 101 (e.g., the processor 120 or 500) may identify, in operation 907, whether DC (e.g., EN-DC) is configured with the first LTE network, based on the first subscriber identity information. According to an embodiment, when connection is made to the first LTE network (e.g., the first node 610) and the first NR network (e.g., the second node 620) for data communication, based on the first subscriber identity information stored in the first subscriber identity module 510, the processor 500 may determine that DC (e.g., EN-DC) is configured with the first LTE network (e.g., the first cellular network). According to an embodiment, when the electronic device 101 is connected only to the first LTE network (e.g., the first node 610) (or the first NR network (e.g., the second node 620)) for data communication, based on the first subscriber identity information, the processor 500 may determine that DC (e.g., EN-DC) is not configured with the first LTE network (e.g., the first cellular network).

According to various embodiments, when DC (e.g., EN-DC) is configured based on the first subscriber identity information (e.g., "yes" in operation 907), the electronic device 101 (e.g., the processor 120 or 500) may restrict, in operation 909, addition of the second NR network (e.g., the fourth cellular network or the second SCG network) based on the second subscriber identity information of the second subscriber identity module 520. According to an embodiment, when data communication based on the first subscriber identity module 510 is configured, the processor 500 may maintain a DC support state of a UE capability related to the second LTE network (e.g., the third cellular network) connected based on the second subscriber identity information stored in the second subscriber identity module 520. The processor 500 may restrict a DC operation based on the second subscriber identity information when DC is configured with the first LTE network (e.g., the first cellular network) in a connected state (e.g., RRC-connected state) while the UE capability related to the second LTE network (e.g., the third cellular network) is configured to support DC. For example, the restricting (deactivating) of the DC operation based on the second subscriber identity information may include a series of operations of restricting addition of the second NR network (e.g., the fourth cellular network) in a state in which the electronic device 101 is connected to the second LTE network (e.g., the third cellular network), based on the second subscriber identity information.

According to various embodiments, when the RAT related to the first subscriber identity module 510 is not an LTE network (e.g., the first LTE network) (e.g., "no" in operation 903), when the state of communication with the first LTE network (e.g., the first cellular network) is not a connected state (e.g., "no" in operation 905), or when DC (e.g., EN-DC) is not configured based on the first subscriber identity information (e.g., "no" in operation 907), the electronic device 101 (e.g., the processor 120 or 500) may allow, in operation 911, addition of the second NR network (e.g., the fourth cellular network or the second SCG network) based on the second subscriber identity information of the second subscriber identity module 520.

According to various embodiments, when the RAT related to the first subscriber identity module 510 is a network (e.g., 2G network or 3G network) not supporting DC, the electronic device 101 (e.g., the processor 120 or 500) may allow addition of the second NR network (e.g., the fourth cellular network or the second SCG network) based on the second subscriber identity information. According to an embodiment, the electronic device 101 (e.g., the processor 120 or 500) may restrict addition of the fourth cellular network (e.g., the second SCG network) based on the second subscriber identity information from a time point at which a measurement operation related to a network supporting DC is performed. For example, the time point at which the measurement operation related to the network supporting DC is performed may include a time point at which measurement related to a network supporting DC is performed, or a time point at which a measurement result is reported. According to an embodiment, the electronic device 101 (e.g., the processor 120 or 500) may restrict addition of the fourth cellular network (e.g., the second SCG network) based on the second subscriber identity information from a time point at which a message related to handover to a network supporting DC is received. For example, the network supporting DC may include at least one of an LTE network and an NR network. For example, the NR network may support stand alone (SA) scheme or a non-stand alone (NSA) scheme.

According to various embodiments, when NE-DC is supported, the electronic device 101 (e.g., the processor 120 or 500) may selectively restrict addition of the second LTE network (e.g., the fourth cellular network) based on the second subscriber identity information of the second subscriber identity module 520, based on whether the RAT related to the first subscriber identity module 510 supports DC, the state of communication with the first NR network (e.g., the first cellular network), and whether DC is configured with the first NR network. According to an embodiment, the processor 500 may restrict a DC operation related to the second subscriber identity information when the RAT of the first subscriber identity module 510 supports DC, the state of communication between the electronic device 101 and the first NR network (e.g., the first cellular network) is a connected state (e.g., RRC connected), and DC is configured with the first NR network in a state in which the UE capability related to the second NR network (e.g., the third cellular network) is configured to support DC. For example, the processor 500 may restrict addition of the second LTE network (e.g., the fourth cellular network or the second SCG network) in a state in which connection to the second NR network (e.g., the third cellular network or the second MCG network) is made based on the second subscriber identity information.

According to various embodiments, when NR-DC is supported, the electronic device 101 (e.g., the processor 120 or 500) may selectively restrict addition of a second type (e.g., about 6 GHz or higher) of second NR network (e.g., the fourth cellular network) based on the second subscriber identity information of the second subscriber identity module 520, based on whether the RAT of the first subscriber identity module 510 supports DC, the state of communication with a first type (e.g., about 6 GHz or lower) of first NR network (e.g., the first cellular network), and whether DC is configured with the first type of first NR network. According to an embodiment, the processor 500 may restrict the DC operation related to the second subscriber identity information when the RAT of the first subscriber identity module 510 supports DC, the state of communication between the electronic device 101 and the first type (e.g., about 6 GHz or lower) of first NR network (e.g., the first cellular network) is a connected state (e.g., RRC connected) in a state in which the UE capability related to the first type (e.g., about 6 GHz or lower) of second NR network (e.g., the third cellular network) is configured to support DC, and DC is configured with the first type of first NR network. For example, the processor 500 may restrict addition of the second type (e.g., about 6 GHz or higher) of second NR network (e.g., the fourth cellular network or the second SCG network) in a state in which connection is made to the first type (e.g., about 6 GHz or lower) of second NR network (e.g., the third cellular network or the second MCG network), based on the second subscriber identity information.

Figure 10:
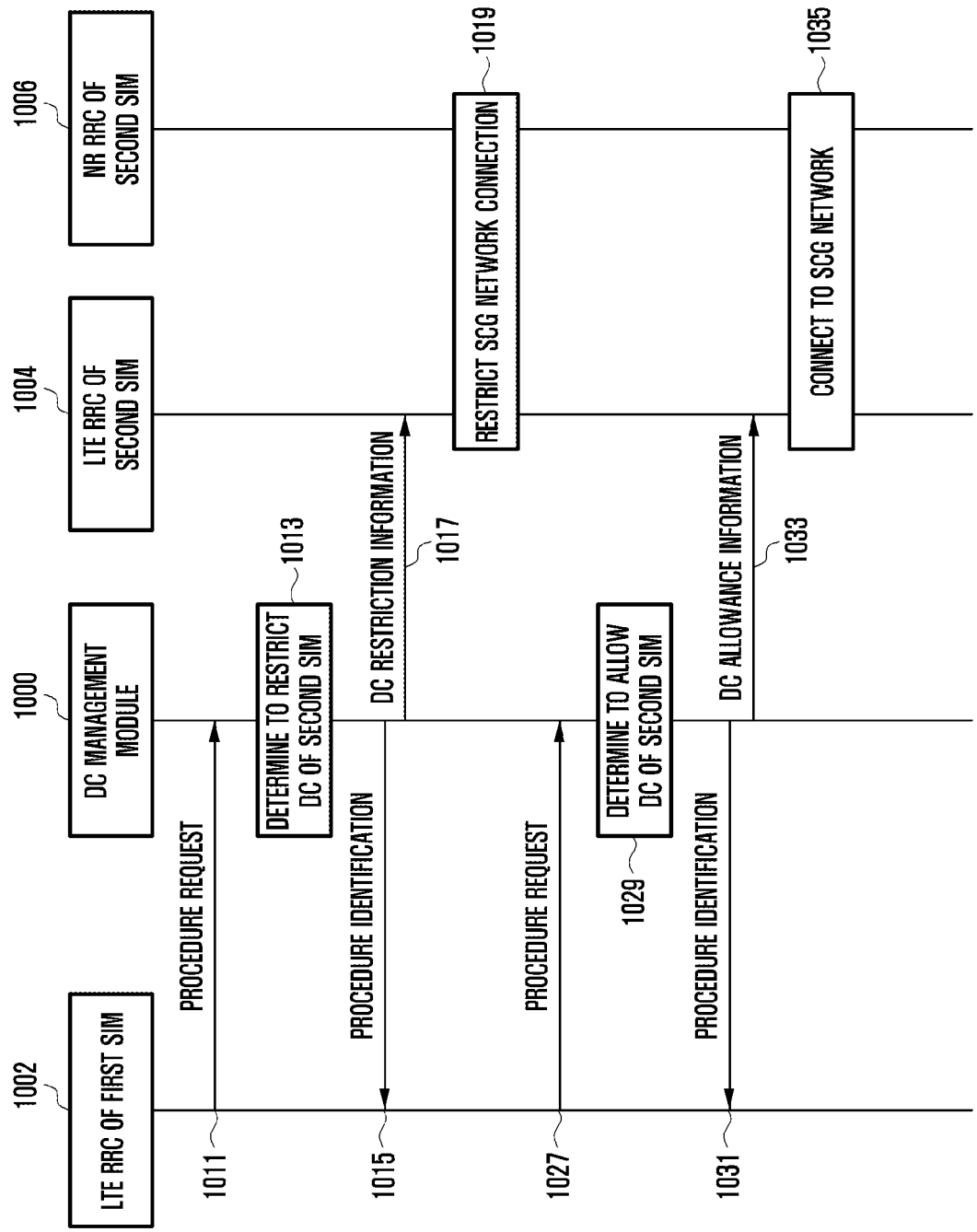
FIG. 10 is an example of controlling dual connectivity related to a second subscriber identity module in an electronic device according to various example embodiments.

FIG. 10 is an example of controlling dual connectivity (DC) related to a second subscriber identity module in an electronic device according to various embodiments. For example, the processor 500 (e.g., CP) may include a DC management module 1000, an LTE RRC 1002 of a first SIM 510, an LTE RRC 1004 of a second SIM 520, and/or an NR RRC 1006 of the second SIM 520. For example, the electronic device 101 may assume that data communication based on first subscriber identity information of the first subscriber identity module 510 is configured. For example, the electronic device 101 may further include an NR RRC (not shown) of the first SIM 510, which corresponds to an RRC layer supporting communication with the first NR network (e.g., the second cellular network), based on the first subscriber identity information of the first subscriber identity module 510. Each "processor" herein comprises processing circuitry.

Referring to FIG. 10, according to various embodiments, the LTE RRC 1002 (e.g., the first communication protocol stack 314 of FIG. 3) of the first SIM 510 of the electronic device 101 may control the wireless communication circuit 530 to connect to the first node 610 (e.g., the first MN or the cell of the first MCG) of the first LTE network (e.g., the first cellular network), based on the first subscriber identity information of the first subscriber identity module 510.

According to various embodiments, when the electronic device 101 is connected to a cell (e.g., the first node 610) of the first LTE network (e.g., the first MCG network), the LTE RRC 1002 of the first SIM 510 may transmit, in operation 1011, a procedure request message related to communication with the cell of the first LTE network to the DC management module 1000. For example, the LTE RRC 1002 of the first SIM 510 is an RRC layer supporting communication with the first LTE network (e.g., the first cellular network or the first MCG network), based on the first subscriber identity information of the first subscriber identity module 510, and may be executed by the processor 500 (e.g., CP) for wireless communication with the first node 610 based on the first subscriber identity information. For example, the DC management module 1000 is a function for determining whether a DC operation related to the first subscriber identity module 510 or the second subscriber identity module 520 is active, and may be executed by the processor 500 (e.g., CP).

According to various embodiments, the DC management module 1000 may receive the procedure request message from the LTE RRC 1002 of the first SIM 510 in operation 1011. The DC management module 1000 may determine, in operation 1013, whether to restrict addition of the second NR network (e.g., the fourth cellular network or the second SCG network) based on the second subscriber identity information of the second subscriber identity module 520, based on procedure request information included in the procedure request message. According to an embodiment, the DC management module 1000 may determine that a DC operation based on the second subscriber identity information of the second subscriber identity module 520 is restricted when the procedure request message acquired from the LTE RRC 1002 of the first SIM 510 is related to at least one of a connected state (e.g., RRC-connected state) of the first LTE network and signaling of the first LTE network.

According to various embodiments, the DC management module 1000, which may comprise processing circuitry, may transmit, to the LTE RRC 1002 of the first SIM 510, a procedure identification message as a response to the procedure request message in operation 1015.

According to various embodiments, when determining to restrict addition of the second NR network based on the second subscriber identity information, the DC management module 1000 may transmit, in operation 1017, information related to the restriction of the addition of the second NR network (e.g., information related to restriction of DC) to the LTE RRC 1004 of the second SIM 520. For example, the LTE RRC 1004 of the second SIM 520 is an RRC layer supporting communication with the second LTE network (e.g., the third cellular network), based on the second subscriber identity information of the second subscriber identity module 520, and may be executed by the processor 500 (e.g., CP) for wireless communication with the third node 630 based on the second subscriber identity information.

According to various embodiments, the LTE RRC 1004 of the second SIM 520 may restrict, in operation 1019, connection to the second NR network (e.g., the second SCG network), based on information related to the restriction of the addition of the second NR network. According to an embodiment, when the electronic device 101 is connected to the second NR network, the LTE RRC 1004 of the second SIM 520 may control the wireless communication circuit 530 to transmit information (e.g., SCG failure information) related to releasing of the connection to the second NR network to the second LTE network (e.g., the third cellular network).

According to an embodiment, the LTE RRC 1004 of the second SIM 520 may transmit information related to the restriction of the addition of the second NR network to the NR RRC 1006 of the second SIM 520. The NR RRC 1006 of the second SIM 520 may restrict a series of operations related to the addition of the second NR network (e.g., the fourth cellular network or the second SCG network), based on the information related to the restriction of the addition of the second NR network. For example, the operation of restricting the addition of the second NR network may include an operation of restricting a measurement operation related to the second NR network or restricting measurement reporting. For example, the NR RRC 1006 of the second SIM 520 is an RRC layer supporting communication with the second NR network (e.g., the fourth cellular network), based on the second subscriber identity information of the second subscriber identity module 520, and may be executed by the processor 500 (e.g., CP) for wireless communication with the fourth node 640 based on the second subscriber identity information.

According to various embodiments, in operation 1027, the LTE RRC 1002 of the first SIM 510 may transmit the procedure request message related to communication with the first LTE network to the DC management module 1000 in a state connection is made to the cell (e.g., the first node 610) of the first LTE network (e.g., the first cellular network or the first MCG network).

According to various embodiments, in operation 1027, the DC management module 1000 may receive the procedure request message from the LTE RRC 1002 of the first SIM 510. The DC management module 1000 may determine, in operation 1029, whether to restrict addition of the second NR network (e.g., the fourth cellular network or the second SCG network) based on the second subscriber identity information of the second subscriber identity module 520, based on the procedure request information included in the procedure request message. According to an embodiment, the DC management module 1000 may determine that a DC operation based on the second subscriber identity information of the second subscriber identity module 520 is allowed when the procedure request message acquired from the LTE RRC 1002 of the first SIM 510 is related to at least one of an idle state (e.g., RRC idle state), an inactive state (e.g., RRC inactive state), SIB reading, a cell search, a background cell search, or cell reselection of the first LTE network. For example, the cell search may include a series of operations of identifying whether there is another cell adjacent to the electronic device 101, other than a cell (serving cell) to which the electronic device 101 is connected. For example, the background cell search may include a series of operations of searching a cell (including a serving cell) to which the electronic device 101 can be connected.

According to various embodiments, the DC management module 1000 may transmit, in operation 1031, the procedure identification message to the LTE RRC 1002 of the first SIM 510, as a response to the procedure request message.

According to various embodiments, when determining to allow the addition of the second NR network based on the second subscriber identity information, the DC management module 1000 may transmit, in operation 1033, information related to the allowance of the addition of the second NR network (e.g., information related to allowance of DC) to the LTE RRC 1004 of the second SIM 520.

According to various embodiments, the LTE RRC 1004 of the second SIM 520 may control, in operation 1035, the wireless communication circuit 530 to perform connection with the second NR network (e.g., the fourth cellular network or the second SCG network). According to an embodiment, the LTE RRC 1004 of the second SIM 520 may transmit information related to the allowance of the addition of the second NR network to the NR RRC 1006 of the second SIM 520. The NR RRC 1006 of the second SIM 520 may control the wireless communication circuit 530 to perform a measurement operation related to the second NR network, based on the information related to the allowance of the addition of the second NR network. For example, the measurement operation related to the second NR network may be performed based on measurement configuration received from the second LTE network (e.g., the third cellular network). According to an embodiment, the LTE RRC 1004 of the second SIM 520 and/or the NR RRC 1006 of the second SIM 520 may control the wireless communication circuit 530 to connect to a cell (e.g., the fourth node 640) of the second NR network (e.g., the fourth cellular network or the second SCG network), based on a measurement result related to the second NR network.

According to various embodiments, the LTE RRC 1004 of the second SIM 520 and/or the NR RRC 1006 of the second SIM 520 may control the wireless communication circuit 530 to transmit and/or receive data through the third node 630 of the second LTE network and/or the fourth node 640 of the second NR network.

According to various embodiments, the LTE RRC 1004 of the second SIM 520 may maintain a DC support state of a UE capability related to the second LTE network (e.g., the third cellular network) connected based on the second subscriber identity information of the second subscriber identity module 520 when data communication based on the first subscriber identity module 510 is configured. According to an embodiment, the LTE RRC 1004 of the second SIM 520 may configure the UE capability related to the second LTE network, transmitted for connection (e.g., radio resource control (RRC) signaling) to the second LTE network (e.g., the third cellular network) or periodically transmitted to the second LTE network, so that the electronic device 101 supports DC related to the second LTE network.

Figure 11:
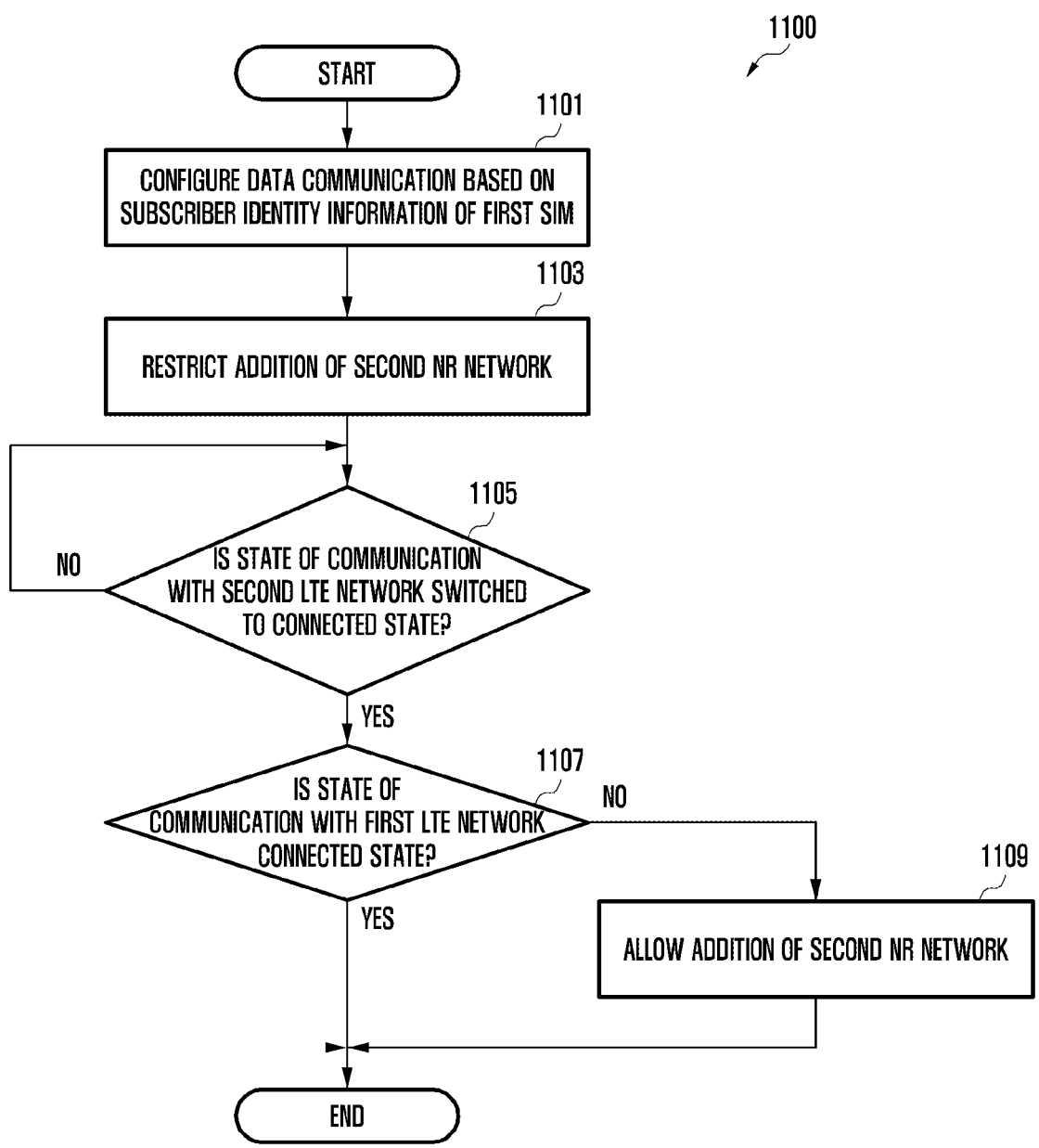
FIG. 11 is an example of a flow chart illustrating controlling of dual connectivity related to a second subscriber identity module in an electronic device according to various example embodiments.

FIG. 11 is an example of a flow chart 1100 illustrating controlling of dual connectivity (DC) related to a second subscriber identity module in an electronic device according to various embodiments. Hereinafter, operations may be sequentially performed, but are not necessary to be sequentially performed. For example, orders of the operations may change, and at least two operations may be performed in parallel. For example, an electronic device of FIG. 11 may be the electronic device 101 of FIG. 1, 2, 3, 4A, 4B, and/or 5. For example, it may be assumed that the first subscriber identity module 510 and the second subscriber identity module 520 of the electronic device 101 support EN-DC. For example, it may be assumed that the first cellular network and the third cellular network support EN-DC.

Referring to FIG. 11, according to various embodiments, in operation 1101, the electronic device 101 (e.g., the processor 120 of FIG. 1 or the processor 500 of FIG. 5) may configure data communication based on first subscriber identity information stored in the first subscriber identity module 510 among the first subscriber identity module 510 and the second subscriber identity module 520 included in the electronic device 101. For example, the first subscriber identity module 510 may be configured (or selected) as a subscriber identity module for data communication, based on a user input, an application program executed in the electronic device 101, or a control signal received from an external device. According to an embodiment, when the data communication based on the first subscriber identity information is configured, the processor 500 may control the wireless communication circuit 530 to connect to the first LTE network (e.g., the first cellular network or the first MCG network) and/or the first NR network (e.g., the second cellular network or the first SCG network), based on the first subscriber identity information stored in the first subscriber identity module 510.

According to various embodiments, the electronic device 101 (e.g., the processor 120 or 500) may restrict, in operation 1103, addition of the second NR network (e.g., the fourth cellular network or the second SCG network) based on the second subscriber identity information of the second subscriber identity module 520, based on configuration of data communication based on the first subscriber identity module 510. According to an embodiment, when the data communication based on the first subscriber identity information is configured, the processor 500 may restrict addition of the second NR network (e.g., the fourth cellular network or the second SCG network) to restrict a DC operation based on the second subscriber identity information. For example, the restriction of the addition of the second NR network may include a series of operations of restricting a measurement operation related to the second NR network (e.g., the fourth cellular network). For example, the restriction of the addition of the second NR network may include a series of operations of rejecting a request for addition or handover for a cell (e.g., the fourth node 640) of the second SCG network (e.g., the second NR network), received from the second LTE network (e.g., the third cellular network or the second MCG network). For example, the series of operations of rejecting the request for cell addition or handover may include an operation of transmitting failure information (e.g., SCG failure information) to the second LTE network (e.g., the third cellular network), as a response to the request for cell addition or handover.

According to various embodiments, the electronic device 101 (e.g., the processor 120 or 500) may identify, in operation 1105, whether the state of communication with the second LTE network (e.g., the third cellular network or the second MCG network) connected based on the second subscriber identity information of the second subscriber identity module 520 is switched to a connected state (e.g., RRC-connected state). According to an embodiment, the state of communication with the second LTE network may be switched to the connected state for reception of a rich communication service or rich communication suite (RCS)-type or multimedia messaging service (MMS)-type message.

According to various embodiments, when the state of communication with the second LTE network (e.g., the third cellular network) is not switched to the connected state (e.g., "no" in operation 1105), the electronic device 101 (e.g., the processor 120 or 500) may identify, in operation 1105, whether the state of communication with the second LTE network (e.g., the third cellular network) is switched to the connected state. According to an embodiment, when the state of communication with the second LTE network (e.g., the third cellular network) is an idle state (or inactive state), the processor 500 may identify whether the state of communication with the second LTE network (e.g., the third cellular network) is switched to the connected state.

According to various embodiments, when the state of commutation with the second LTE network (e.g., the third cellular network) is switched to the connected state (e.g., "yes" in operation 1105), the electronic device 101 (e.g., the processor 120 or 500) may identify, in operation 1107, whether the state of communication with the first LTE network (e.g., the first cellular network) connected based on the first subscriber identity information stored in the first subscriber identity module 510 is the connected state (e.g., RRC-connected state).

According to various embodiments, when the state of communication with the first LTE network (e.g., the first cellular network) is a connected state (e.g., "yes" in operation 1107), the electronic device 101 (e.g., the processor 120 or 500) may terminate the embodiment of controlling dual connectivity (DC) based on the second subscriber identity information of the second subscriber identity module 520. According to an embodiment, when the state of communication between the electronic device 101 and the first LTE network (e.g., the first cellular network) is a connected state, the processor 500 may maintain the state of restriction of addition of the second NR network (e.g., the fourth cellular network or the second SCG network) base on the second subscriber identity information of the second subscriber identity module 520.

According to various embodiments, when the state of communication with the first LTE network (e.g., the first cellular network) is not a connected state (e.g., "no" in operation 1107), the electronic device 101 (e.g., the processor 120 or 500) may allow, in operation 1109, addition of the second NR network (e.g., the fourth cellular network or the second SCG network) based on the second subscriber identity information of the second subscriber identity module 520. According to an embodiment, when the state of communication between the electronic device 101 and the first LTE network (e.g., the first cellular network) is an idle state (e.g., RRC idle state), the processor 500 may determine that data communication based on the first subscriber identity module 510 is not performed. The processor 500 may control the wireless communication circuit 530 to perform data communication based on the second subscriber identity information of the second subscriber identity module 520 while the data communication based on the first subscriber identity module 510 is not performed. When the second LTE network connected based on the second subscriber identity information supports DC (e.g., EN-DC), the processor 500 may allow the addition of the second NR network (e.g., the fourth cellular network or the second SCG network) based on the second subscriber identity information. For example, the processor 500 may control the wireless communication circuit 530 to perform a measurement operation with the second NR network.

According to various embodiments, when the state of communication with the second LTE network (e.g., the third cellular network) is switched to a connected state, the electronic device 101 (e.g., the processor 120 or 500) may identify the state of communication of the first LTE network (e.g., the first cellular network) connected based on the first subscriber identity information, and whether DC is established. According to an embodiment, when the state of communication between the electronic device 101 and the first LTE network (e.g., the first cellular network) is a connected state and DC is established through the first LTE network (e.g., the first cellular network), the electronic device 101 (e.g., the processor 120 or 500) may maintain the restriction of a DC operation based on the second subscriber identity information. According to an embodiment, when the state of communication between the electronic device 101 and the first LTE network (e.g., the first cellular network) is an idle state (or inactive state) or DC is not established through the first LTE network (e.g., the first cellular network), the electronic device 101 (e.g., the processor 120 or 500) may allow (or activate) the DC operation based on the second subscriber identity information.

According to various embodiments, when the state of communication with the second LTE network (e.g., the third cellular network) is switched to a connected state, the electronic device 101 (e.g., the processor 120 or 500) may identify an RAT related to the first subscriber identity module 510, the state of communication of the first LTE network (e.g., the first cellular network), and whether DC is established. According to an embodiment, when the RAT related to the first subscriber identity module 510 is configured as a network (e.g., the first LTE network) supporting DC, the state of communication between the electronic device 101 and the first LTE network is a connected state, and DC is established through the first LTE network, the electronic device 101 (e.g., the processor 120 or 500) may maintain the retraction of the DC operation based on the second subscriber identity information. According to an embodiment, when the RAT-related to the first subscriber identity module 510 does not support DC, when the state of communication between the electronic device 101 and the first LTE network is an idle state (or an inactive state), or when DC is not established through the first LTE network, the electronic device 101 (e.g., the processor 120 or 500) may allow the DC operation based on the second subscriber identity information.

Figure 12:
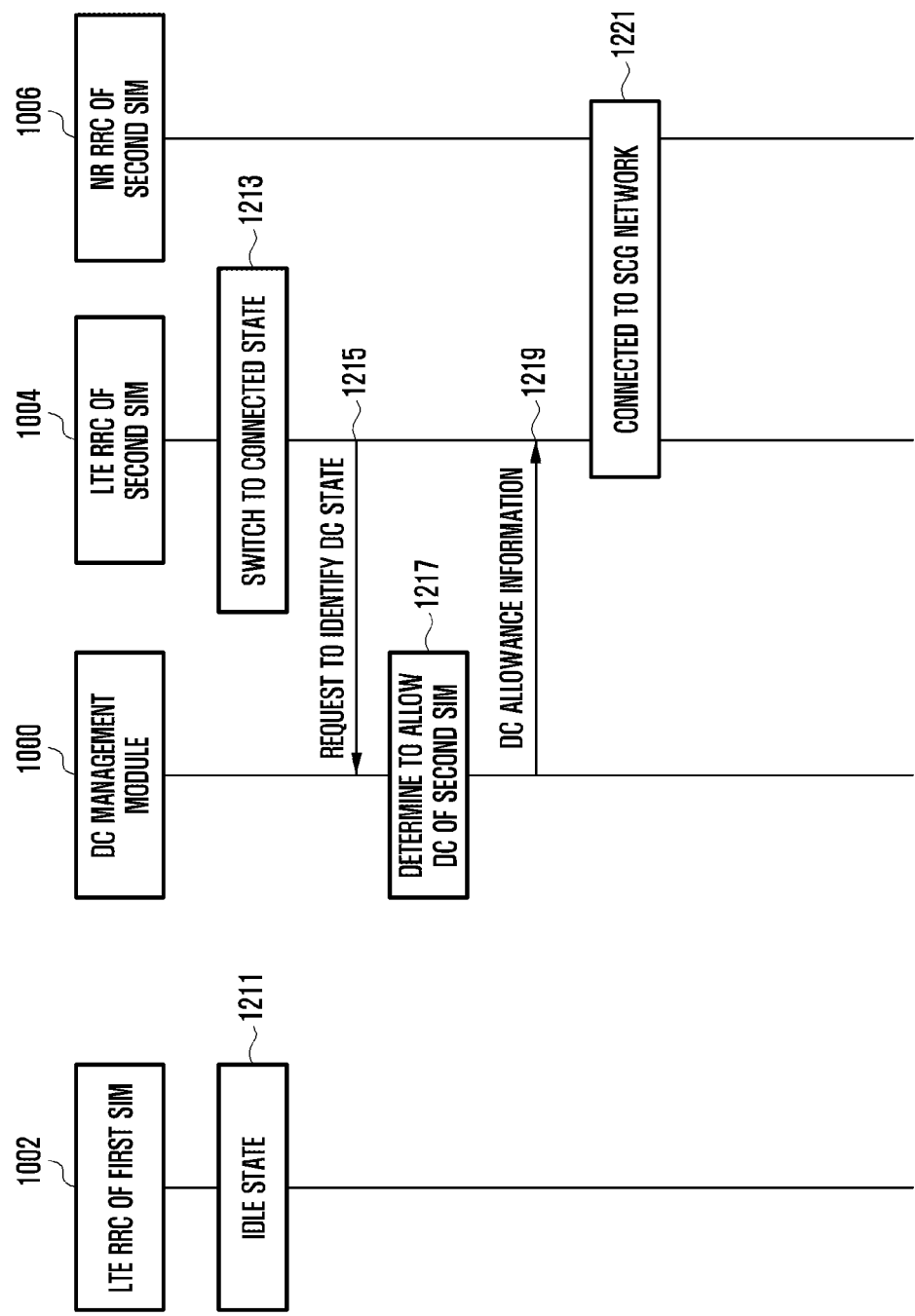
FIG. 12 is an example of controlling dual connectivity related to a second subscriber identity module when a state of communication based on a first subscriber identity module is an idle state in an electronic device according to various example embodiments.

FIG. 12 is an example of controlling dual connectivity (DC) related to a second subscriber identity module when a state of communication based on a first subscriber identity module is an idle state in an electronic device according to various embodiments.

Referring to FIG. 12, according to various embodiments, the electronic device 101 may configure data connection based on first subscriber identity information of the first subscriber identity module 510 among the first subscriber identity module 510 and the second subscriber identity module 520 included in the electronic device 101. The electronic device 101 may restrict a DC operation based on second subscriber identity information of the second subscriber identity module 520, based on configuration of data communication based on the first subscriber identity information. For example, the restriction of the DC operation based on the second subscriber identity information may include a series of operations of restricting addition of a cell (e.g., the fourth node 640) of the second NR network (e.g., the fourth cellular network or the second SCG network), based on the second subscriber identity information.

According to various embodiments, the LTE RRC 1004 (e.g., the third communication protocol stack 318 of FIG. 3) of the second SIM 520 of the electronic device 101 may identify, in operation 1213, whether the state of communication with the second LTE network (e.g., the third cellular network) connected based on the second subscriber identity information of the second subscriber identity module 520 is switched to a connected state (e.g., RRC-connected state). When the state of communication with the second LTE network is switched to the connected state (operation 1213), the LTE RRC 1004 of the second SIM 520 may transmit (e.g., in operation 1215) a request message for identifying the state of a DC operation based on the second subscriber identity information of the second subscriber identity module 520, to the DC management module 1000.

According to various embodiments, the DC management module 1000 of the electronic device 101 may determine whether to allow dual connectivity (DC) based on the second subscriber identity information, based on the state of communication with the first LTE network (e.g., the first cellular network) connected based on the first subscriber identity information of the first subscriber identity module 510. According to an embodiment, when the state of communication between the electronic device 101 and the first LTE network is an idle state (e.g., RRC idle state) (operation 1211), the DC management module 1000 may determine to allow a dual connectivity (DC) operation based on the second subscriber identity information in operation 1217.

According to various embodiments, when determining to allow the DC operation based on the second subscriber identity information (operation 1217), the DC management module 1000 may transmit information related to the allowance of DC to the LTE RRC 1004 of the second SIM 520 in operation 1219.

According to various embodiments, the LTE RRC 1004 of the second SIM 520 may control, in operation 1221, the wireless communication circuit 530 to perform connection with the second SCG network (e.g., the second NR network), based on information related to the allowance of DC. According to an embodiment, the LTE RRC 1004 of the second SIM 520 may transmit the information related to the allowance of DC to the NR RRC 1006 of the second SIM 520. The NR RRC 1006 of the second SIM 520 may control the wireless communication circuit 530 to perform a measurement operation related to the second NR network, based on the information related to the allowance of DC. For example, the measurement operation related to the second NR network may be performed based on measurement configuration received from the second LTE network (e.g., the third cellular network). According to an embodiment, the LTE RRC 1004 of the second SIM 520 and/or the NR RRC 1006 of the second SIM 520 may control the wireless communication circuit 530 to connect to a cell (e.g., the fourth node 640) of the second NR network (e.g., the fourth cellular network or the second SCG network), based on a measurement result related to the second NR network.

According to various embodiments, when connection is made to a cell (e.g., the third node 630) of the second LTE network and a cell (e.g., the fourth node 640) of the second NR network, the LTE RRC 1004 of the second SIM 520 and/or the NR RRC 1006 of the second SIM 520 may control the wireless communication circuit 530 to transmit and/or receive data through the cell of the second LTE network and/or the cell of the second NR network.

According to various embodiments, the DC management module 1000 may transmit the information related to the state of communication with the first LTE network, acquired from the LTE RRC 1002 of the first SIM 510, to the LTE RRC 1004 of the second SIM 520. According to an embodiment, the DC management module 1000 may identify whether the state of communication between the electronic device 101 and the first LTE network is switched, based on the information related to the state of communication with the first LTE network, acquired from the LTE RRC 1002 of the first SIM 510. When the state of communication between the electronic device 101 and the first LTE network is switched, the DC management module 1000 may transmit the information related to the communication state between the electronic device 101 and the first LTE network may be transmitted to the LTE RRC 1004 of the second SIM 520. According to an embodiment, when the state of communication with the second LTE network is switched to a connected state (e.g., RRC-connected state), the LTE RRC 1004 of the second SIM 520 may determine whether to allow dual connectivity (DC) based on the second subscriber identity information, based on the information related to the state of communication of the first LTE network with the electronic device 101, acquired from the DC management module 1000. In this case, operations 1215 to 1219 of FIG. 12 can be omitted.

Figure 13:
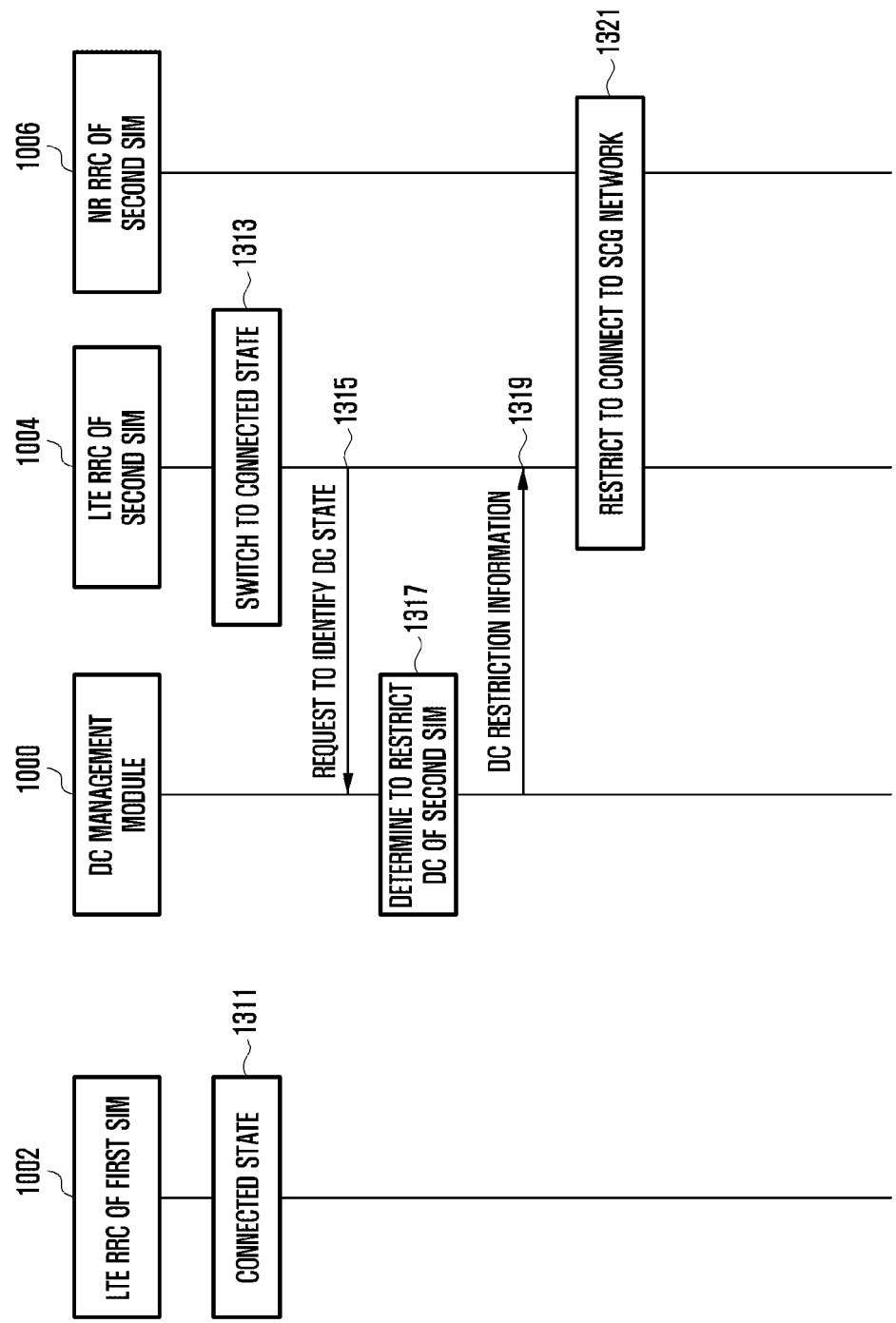
FIG. 13 is an example of controlling dual connectivity related to a second subscriber identity module when a state of communication based on a first subscriber identity module is a connected state in an electronic device according to various example embodiments.

FIG. 13 is an example of controlling dual connectivity (DC) related to a second subscriber identity module when a state of communication based on a first subscriber identity module is a connected state in an electronic device according to various embodiments.

Referring to FIG. 13, according to various embodiments, the electronic device 101 may restrict a DC operation based on second subscriber identity information of the second subscriber identity module 520, based on configuration of data communication based on first subscriber identity information of the first subscriber identity module 510. According to an embodiment, when the DC operation based on the second subscriber identity information is restricted, the electronic device 101 may restrict a measurement operation and/or a measurement report operation related to the second NR network to restrict addition of a cell (e.g., the fourth node 640) of the second NR network (e.g., the fourth cellular network or the second SCG network), based on the second subscriber identity information. According to an embodiment, when the DC operation based on the second subscriber identity information is restricted, the electronic device 101 may transmit failure information to the second LTE network (e.g., the third cellular network or the second MCG network), as a response to a request for addition or handover for a cell (e.g., the fourth node) of the second NR network.

According to various embodiments, the LTE RRC 1004 (e.g., the third communication protocol stack 318 of FIG. 3) of the second SIM 520 of the electronic device 101 may identify, in operation 1313, whether the state of communication with the second LTE network (e.g., the third cellular network) is switched to a connected state (e.g., RRC-connected state), based on the second subscriber identity information of the second subscriber identity module 520. When the state of communication with the second LTE network is switched to the connected state (operation 1313), the LTE RRC 1004 of the second SIM 520 may transmit, in operation 1315, a request message for identifying the state of a DC operation based on the second subscriber identity information of the second subscriber identity module 520, to the DC management module 1000.

According to various embodiments, the DC management module 1000 of the electronic device 101 may determine whether to allow dual connectivity (DC) based on the second subscriber identity information, based on the state of communication with the first LTE network connected based on the first subscriber identity information of the first subscriber identity module 510. According to an embodiment, when the state of communication between the electronic device 101 and the first LTE network is a connected state (e.g., RRC-connected state) (operation 1311), the DC management module 1000 may determine to restrict a dual connectivity (DC) operation based on the second subscriber identity information in operation 1317.

According to various embodiments, when determining to restrict the DC operation based on the second subscriber identity information (operation 1317), the DC management module 1000 may transmit information related to the restriction of DC to the LTE RRC 1004 of the second SIM 520 in operation 1319. According to an embodiment, the information related to the restriction of DC may include information related to the restriction of addition of the second NR network.

According to various embodiments, the LTE RRC 1004 of the second SIM 520 may restrict, in operation 1321, additional connection to a cell (e.g., the fourth node 640) of the second NR network, based on the information related to the restriction of DC. According to an embodiment, the LTE RRC 1004 of the second SIM 520 and/or the NR RRC 1006 of the second SIM 520 may restrict a measurement operation related to the second NR network (e.g., the fourth cellular network) and/or a measurement report operation related to the second NR network so as to restrict the additional connection to the second NR network (e.g., the fourth cellular network). According to an embodiment, the LTE RRC 1004 of the second SIM 520 and/or the NR RRC 1006 of the second SIM 520 may control the wireless communication circuit 530 to transmit failure information (or rejection information) to the second LTE network (e.g., the third cellular network), as a response to a request for addition or handover for a cell (e.g., the fourth node 640) of the second NR network (e.g., the second SCG network), received from the second LTE network (e.g., the third cellular network), so as to restrict the additional connection to the second NR network (e.g., the fourth cellular network).

According to various embodiments, the DC management module 1000 may transmit information related to the state of communication between the electronic device 101 and the first LTE network, acquired from the LTE RRC 1002 of the first SIM 510, to the LTE RRC 1004 of the second SIM 520. According to an embodiment, when the state of communication with the second LTE network is switched to a connected state (e.g., RRC-connected state), the LTE RRC 1004 of the second SIM 520 may determine whether to allow dual connectivity (DC) based on the second subscriber identity information, based on the information related to state of communication between the electronic device 101 and the first LTE network, acquired from the DC management module 1000. In this case, operations 1315 to 1319 of FIG. 13 can be omitted.

Figure 14:
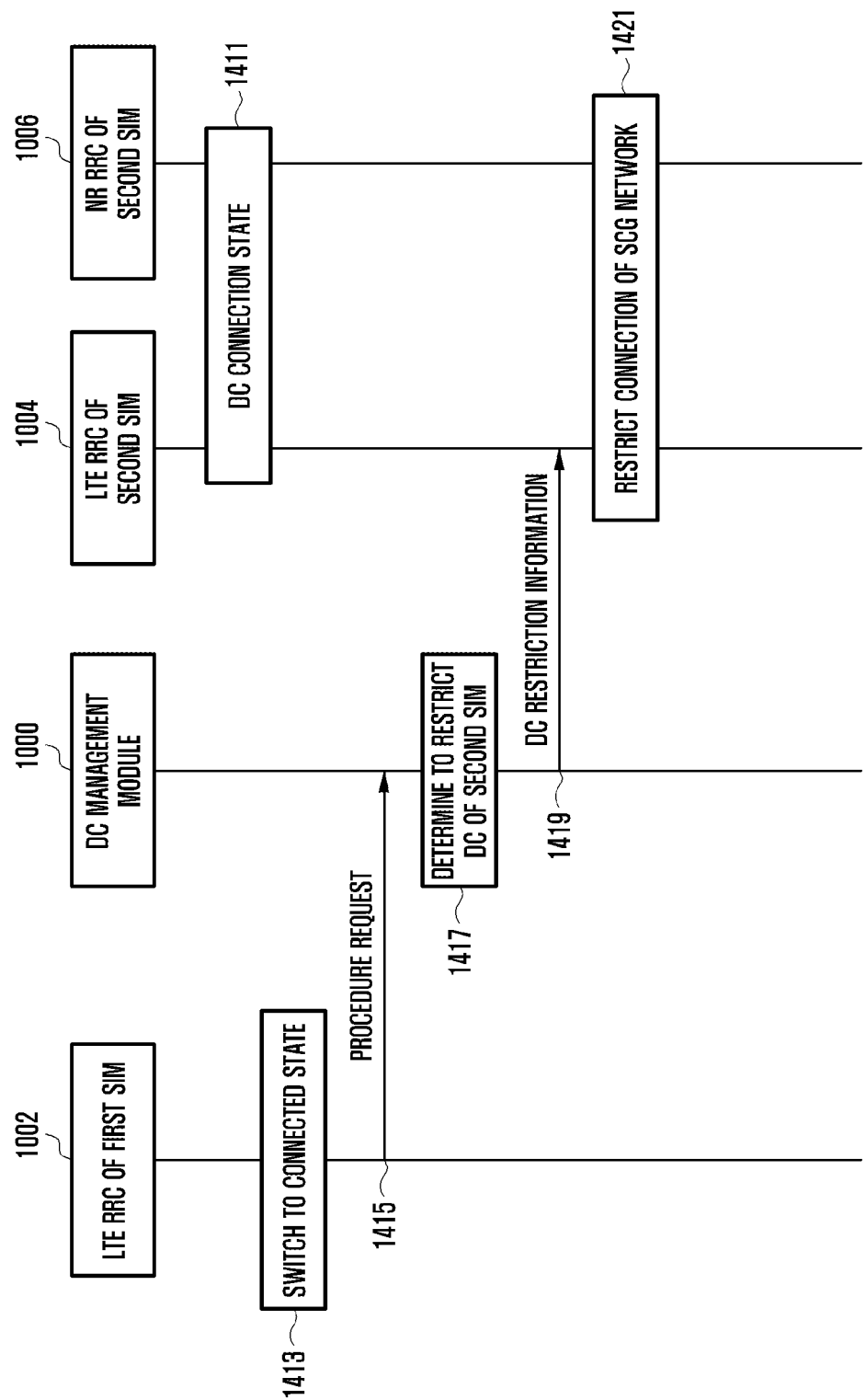
FIG. 14 is an example of controlling dual connectivity related to a second subscriber identity module, based on a connection state of communication based on a first subscriber identity module in an electronic device according to various example embodiments.

FIG. 14 is an example of controlling dual connectivity (DC) related to a second subscriber identity module, based on a connection state of communication based on a first subscriber identity module in an electronic device according to various embodiments. For example, the electronic device 101 may assume that data communication based on the first subscriber identity module 510 is configured.

Referring to FIG. 14, according to various embodiments, the electronic device 101 may restrict a DC operation based on second subscriber identity information of the second subscriber identity module 520, based on configuration of data communication based on first subscriber identity information of the first subscriber identity module 510. For example, the restriction of the DC operation based on the second subscriber identity information may include a series of operations of restricting addition of a cell (e.g., the fourth node 640) of the second NR network (e.g., the fourth cellular network or the second SCG network).

According to various embodiments, the electronic device 101 may allow, in operation 1411, dual connectivity (DC) based on the second subscriber identity information, based on the state of communication of the first LTE network (e.g., the first cellular network or the first MCG network) connected based on the first subscriber identity information of the first subscriber identity module 510. According to an embodiment, based on operations 1211 to 1221 of FIG. 12, the electronic device 101 may allow dual connectivity (DC), based on the second subscriber identity information.

According to various embodiments, when the state of communication with a cell (e.g., the first node 610) of the first LTE network is switched to a connected state (e.g., RRC-connected state) (operation 1413), the LTE RRC 1002 (e.g., the first communication protocol stack 314 of FIG. 3) of the first SIM 510 of the electronic device 101 may transmit, in operation 1415, a procedure request message related to communication with the first LTE network to the DC management module 1000. For example, the procedure request message may include information related to switching to a connected state (e.g., RRC connected state).

According to various embodiments, the DC management module 1000 may receive the procedure request message from the LTE RRC 1002 of the first SIM 510 in operation 1415. The DC management module 1000 may determine, in operation 1417, to restrict the DC operation based on the second subscriber identity information, based on the information related to switching to the connected state of the first LTE network, included in the procedure request message.

According to various embodiments, when determining to restrict the DC operation based on the second subscriber identity information, the DC management module 1000 may transmit, in operation 1419, the information related to the restriction of DC to the LTE RRC 1004 of the second SIM 520. According to an embodiment, the information related to the restriction of DC may include information related to restriction of addition of the second NR network.

According to various embodiments, the LTE RRC 1004 of the second SIM 520 may restrict, in operation 1421, the DC operation based on the second subscriber identity information, based on the information related to the restriction of DC. According to an embodiment, the LTE RRC 1004 of the second SIM 520 may control the wireless communication circuit 530 to release connection to the second NR network, based on the information related to the restriction of DC. For example, the LTE RRC 1004 of the second SIM 520 may control the wireless communication circuit 530 to transmit SCG failure information to the second LTE network (e.g., the first MCG network) to release connection to the second NR network (e.g., the second SCG network). The LTE RRC 1004 of the second SIM 520 may transmit information related to the releasing of the connection to the second NR network to the NR RRC 1006 of the second SIM 520, based on the information related to the restriction of DC.

According to various embodiments, when determining that the state of communication with the first LTE network (e.g., the first cellular network or the first MCG network) connected based on the first subscriber identity information of the first subscriber identity module 510 is to be switched to a connected state, the electronic device 101 may restrict the DC operation based on the second subscriber identity information.

According to various embodiments, when the state of communication with the first LTE network (e.g., the first cellular network or the first MCG network) connected based on the first subscriber identity information of the first subscriber identity module 510 is connected to the connected state, the electronic device 101 may restrict the DC operation based on the second subscriber identity information.

Figure 15:
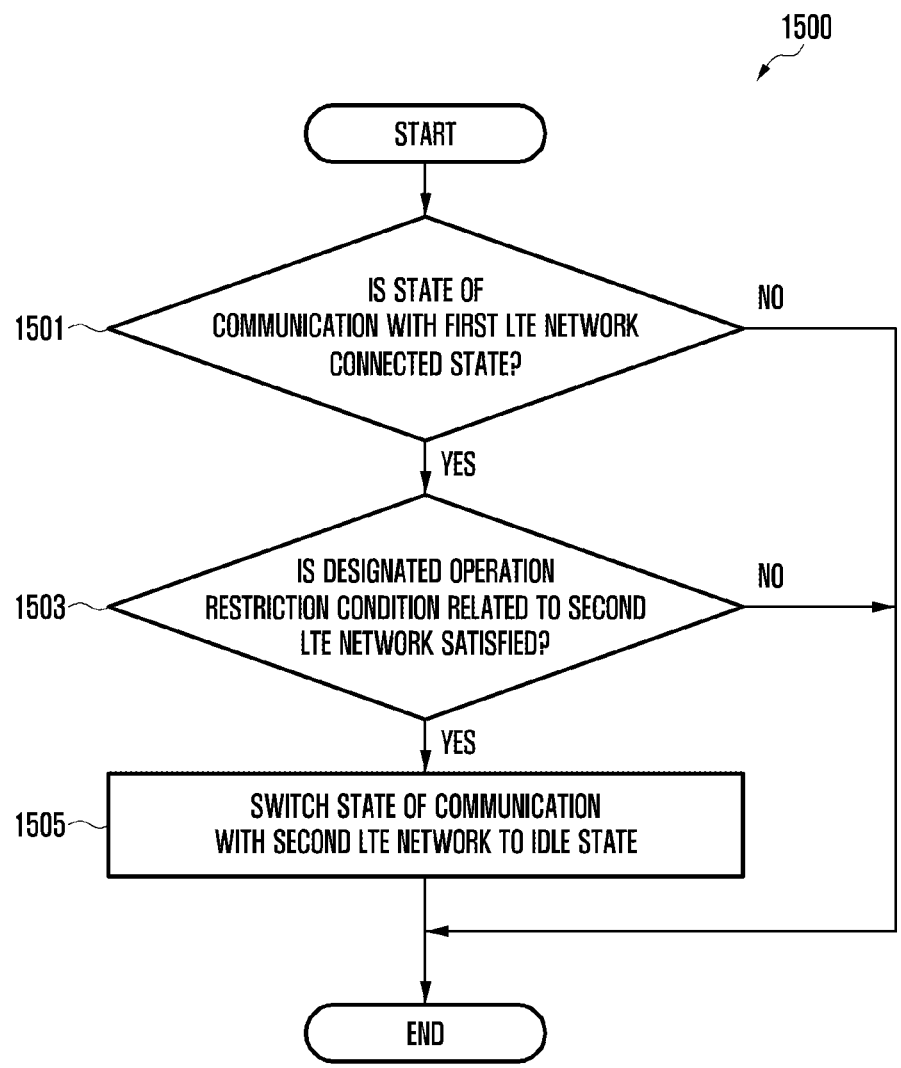
FIG. 15 is a flow chart illustrating controlling of connection with an MCG network in an electronic device according to various example embodiments.

FIG. 15 is a flow chart 1500 illustrating controlling of connection with an MCG network in an electronic device according to various embodiments. In the embodiment below, operations may be sequentially performed, but are not necessary to be sequentially performed. For example, orders of the operations may change, and at least two operations may be performed in parallel. For example, an electronic device of FIG. 15 may be the electronic device 101 of FIG. 1, 2, 3, 4A, 4B, and/or 5.

Referring to FIG. 15, according to various embodiments, when data communication based on first subscriber identity information of the first subscriber identity module 510 among multiple subscriber identity modules 510 and/or 520 included in the electronic device 101 is configured, the electronic device 101 (e.g., the processor 120 of FIG. 1 or the processor 500 of FIG. 5) may identify, in operation 1501, whether a DC operation based on second subscriber identity information of the second subscriber identity module 520 is restricted, based on the state of communication with the first LTE network (e.g., the first cellular network or the first MCG network) connected, directly or indirectly, based on the first subscriber identity information. According to an embodiment, when the state of communication between the electronic device 101 and the first LTE network is a connected state (e.g., RRC-connected state), the processor 500 may restrict (or deactivate) the DC operation based on the second subscriber identity information. When the state of communication between the electronic device 101 and the first LTE network is an idle state (e.g., RRC idle state), the processor 500 may allow (or activate) the DC operation based on the second subscriber identity information. According to an embodiment, when the state of communication between the electronic device 101 and the first LTE network is a connected state and DC is established through the first LTE network, the processor 500 may restrict (or deactivate) the DC operation based on the second subscriber identity information. When the state of communication between the electronic device 101 and the first LTE network is an idle state (or inactive state) or DC is not established through the first LTE network, the processor 500 may allow (or activate) the DC operation based on the second subscriber identity information. According to an embodiment, when a radio access technology (RAT) related to the first subscriber identity module 510 is configured as a network (e.g., the first LTE network) supporting DC, the state of communication between the electronic device 101 and the first LTE network is a connected state, and DC is established through the first LTE network, the processor 500 may restrict (or deactivate) the DC operation based on the second subscriber identity information. When the RAT related to the first subscriber identity module 510 is configured as a network not supporting DC, when the state of communication between the electronic device 101 and the first LTE network is an idle state (e.g., inactive state), or when DC is not established through the first LTE network, the processor 500 may allow (or activate) the DC operation based on the second subscriber identity information.

According to various embodiments, when the DC operation based on the second subscriber identity information is allowed (e.g., "no" in operation 1501), the electronic device 101 (e.g., the processor 120 or 500) may terminate the embodiment of controlling the connection to the second LTE network (e.g., the third cellular network or the second MCG network) connected based on the second subscriber identity information.

According to various embodiments, when the DC operation based on the second subscriber identity information is restricted (e.g., "yes" in operation 1501), the electronic device 101 (e.g., the processor 120 or 500) may identify, in operation 1503, whether a designated restriction condition related to the second LTE network (e.g., the second MCG network) is satisfied. According to an embodiment, when transmission and/or reception of a signal related to an IMS service (e.g., voice call) has not been performed through the second LTE network (e.g., the second MCG network) for a designated time interval, the processor 500 may identify whether execution of an application program related to the IMS service is terminated. For example, when transmission and/or reception of a signal related to an IMS service (e.g., voice call) has not been performed through the second LTE network (e.g., the second MCG network) for a designated time interval and execution of an application program related to the IMS service is terminated, the processor 500 may determine that the designated restriction condition related to the second LTE network (e.g., the second MCG network) is satisfied. For example, when transmission and/or reception of a signal related to an IMS service (e.g., voice call) is performed through the second LTE network (e.g., the second MCG network) or an application program related to the IMS service is being executed, the processor 500 may determine that the designated restriction condition related to the second LTE network (e.g., the second MCG network) is not satisfied.

According to various embodiments, when determining that the designated restriction condition related to the second LTE network (e.g., the second MCG network) is not satisfied (e.g., "no" in operation 1503), the electronic device 101 (e.g., the processor 120 or 500) may terminate the embodiment of controlling the connection to the second LTE network.

According to various embodiments, when determining that the designated restriction condition related to the second LTE network (e.g., the second MCG network) is satisfied (e.g., "yes" in operation 1503), the electronic device 101 (e.g., the processor 120 or 500) may switch, in operation 1505, the state of communication with the second LTE network (e.g., the second MCG network) to an idle state. According to an embodiment, when transmission and/or reception of a signal related to an IMS service (e.g., voice call) has not been performed through the second LTE network (e.g., the second MCG network) for a designated time interval and execution of an application program related to the IMS service is terminated, the processor 500 (e.g., the LTE RRC 1004 of the second SIM 520) may determine that the IMS service related to the second LTE network (e.g., the second MCG network) is not provided. The processor 500 (e.g., the LTE RRC 1004 of the second SIM 520) may determine to enter into an idle state (e.g., RRC idle state) through local release, based on the determination on that the IMS service related to the second LTE network (e.g., the second MCG network) is not provided. For example, the entering into the idle state through the local release may be determined in non-access stratum (NAS) of the electronic device 101. For example, information related to execution of an application program may be acquired from an application processor (AP).

According to an embodiment, the processor 500 (e.g., the access stratum (AS) or the LTE RRC 1004 of the second SIM 520) may configure failure in connection with the second LTE network (e.g., the second MCG network) (e.g., RRC connection failure), based on information related to the local release. The processor 500 (e.g., the AS or the LTE RRC 1004 of the second SIM 520) may switch the state of communication with the second LTE network (e.g., the second MCG network) to an idle state (e.g., RRC idle state) through tracking area update (TAU) related to occurrence of RRC connection re-establishment (RRE).

Figure 16:
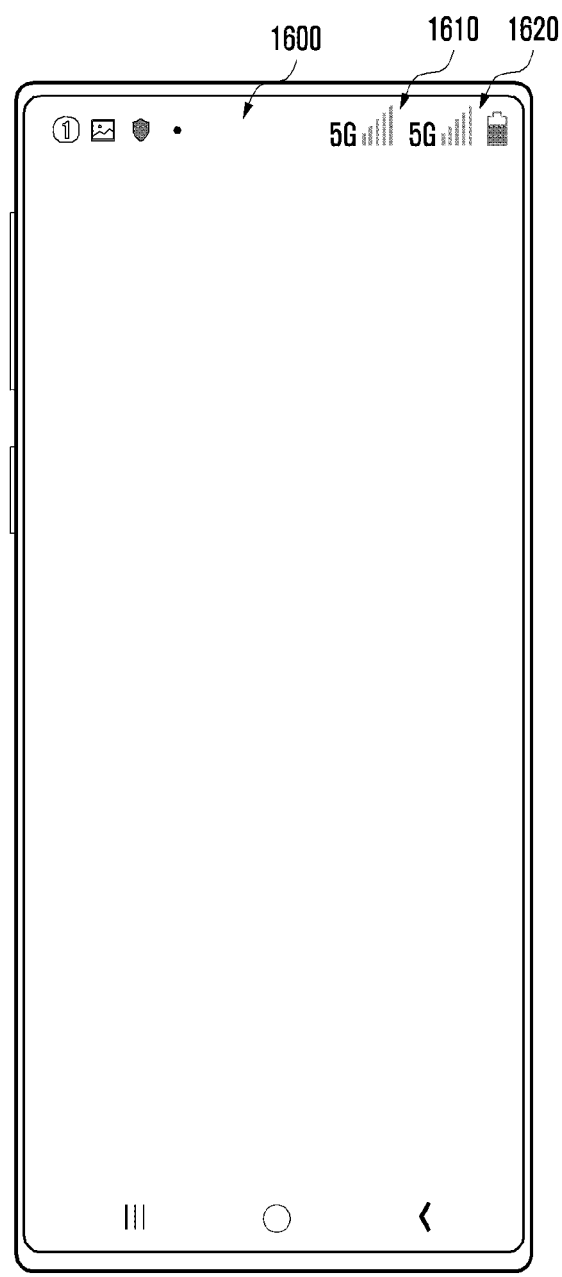
FIG. 16 is an example illustrating displaying of communication information related to multiple subscriber identity modules in an electronic device according to various example embodiments.

FIG. 16 is an example illustrating displaying of communication information related to multiple subscriber identity modules in an electronic device according to various embodiments. For example, it may be assumed that the first subscriber identity module 510 and the second subscriber identity module 520 of the electronic device 101 support DC.

Referring to FIG. 16, according to various embodiments, when data communication based on the first subscriber identity module 510 is configured in a state in which the first subscriber identity module 510 and the second subscriber identity module 520 are activated, the electronic device 101 may configure (or maintain) a UE capability related to the second cellular network (e.g., the second LTE network) to support DC. According to an embodiment, the electronic device 101 may selectively restrict a DC operation related to the second subscriber identity module 520, based on the state (e.g., RRC state) of communication with the first cellular network in the state in which the UE capability related to the second cellular network is configured to support DC.

According to various embodiments, the electronic device 101 may identify whether the first cellular network connected based on the first subscriber identity information of the first subscriber identity module 510 and the second cellular network connected based on the second subscriber identity information of the second subscriber identity module 520 support DC (e.g., EN-DC). According to an embodiment, the electronic device 101 may identify whether the first cellular network and/or the second cellular network supports DC (e.g., EN-DC), from "upperLayerIndication-r15" of system information block (SIB) 2 received from the first cellular network (e.g., the first LTE network) and/or the second cellular network. According to an embodiment, the electronic device 101 may identify whether the first cellular network and/or the second cellular network supports DC (e.g., EN-DC), based on a value of a "restrictDCNR bit" included in a connection acceptance (attach accept) message or tracking area update (TAU) acceptance message acquired from the first cellular network and/or the second cellular network in the process of connecting (being attracted) to the first cellular network and/or the second cellular network. According to an embodiment, the electronic device 101 may identify whether the first cellular network and/or the second cellular network supports DC (e.g., EN-DC), based on whether "NR-config-r15" and "NR-radiobearerConfig-r15" are included in an RRC connection reconfiguration message received from the first cellular network and/or the second cellular network.

According to various embodiments, when determining that the first cellular network and the second cellular network support DC (e.g., EN-DC), the electronic device 101 may display information related to supporting of an NR network of the first subscriber identity module 510 and the second subscriber identity module 520. According to an embodiment, the electronic device 101 may display NR network support information 1610 and 1620 of the first subscriber identity module 510 and the second subscriber identity module 520 on a notification bar 1600 of a display (not shown). As the UE capability related to the second cellular network (e.g., the second LTE network) is configured (or maintained) to support DC even though the DC operation related to the second subscriber identity module 520 is restricted, the electronic device 101 may display the NR network support information 1620 of the second subscriber identity module 520.

According to various embodiments, an operation method of an electronic device (e.g., the electronic device 101 of FIG. 1, 2, 3, 4A, 4B, or 5) including multiple subscriber identity modules (e.g., the subscriber identity module 196 of FIG. 1, the first subscriber identity module 510 of FIG. 5, or the second subscriber identity module 520 of FIG. 5) may include connecting to, when data communication using first subscriber identity information included in a first SIM among the multiple SIMs is configured, a first master cell group (MCG) network or the first MCG network and a first secondary cell group (SCG) network, based on the first subscriber identity information, identifying a state of communication with the first MCG network, restricting addition of a second SCG network, based on second subscriber identity information of a second SIM when the state of communication with the first MCG network is a connected state, and allowing addition of the second SCG network, based on the second subscriber identity information when the state of communication with the first MCG network is an idle state.

According to various embodiments, the method may further include maintaining a dual connectivity (DC) support state of a UE capability related to a second MCG network connected based on the second subscriber identity information of the second SIM when the data communication using the first subscriber identity information included in the first SIM is configured.

According to various embodiments, the method may further include restricting at least one of a measurement operation and a measurement report operation related to the second SCG network when measurement configuration is received from a second MCG network connected based on the second subscriber identity information of the second SIM in a state in which addition of the second SCG network is restricted.

According to various embodiments, the method may further include transmitting, when a message related to a request for cell addition or handover of a second SCG network is received from the second MCG network connected based on the second subscriber identity information of the second SIM in a state in which addition of the second SCG network is restricted, a message related to failure in the request for cell addition or handover to the second MCG network.

According to various embodiments, the restricting of the addition of the second SCG network may include restricting addition of the second SCG network when the state of communication with the first MCG network connected based on the first subscriber identity information of the first SIM is a connected state and DC is configured through the first MCG network.

According to various embodiments, the allowing of the addition of the second SCG network may include allowing addition of the second SCG network when the state of communication with the first MCG network connected, directly or indirectly, based on the first subscriber identity information of the first SIM is an idle state, or when the state of communication with the first MCG network is a connected state and DC is not configured through the first MCG network.

According to various embodiments, the restricting of the addition of the second SCG network may include restricting addition of the second SCG network when a radio access technology (RAT) of the first SIM is a network supporting DC, the state of communication with the first MCG network based on the first subscriber identity information of the first SIM is a connected state, and DC is configured through the first MCG network.

Each embodiment herein may be used in combination with any other embodiment(s) described herein.

According to various embodiments, the allowing of the addition of the second SCG network may include allowing addition of the second SCG network when the RAT of the first SIM is a network not supporting DC, when the state of communication with the first MCG network based on the first subscriber identity information of the first SIM is an idle state, or when DC is not configured through the first MCG network. "Based on" as used herein covers based at least on.

According to various embodiments, the method may further include connecting to the second SCG network through a second MCG network connected, directly or indirectly, based on the second subscriber identity information when addition of the second SCG network, based on the second subscriber identity information of the second SIM, is allowed, and transmitting information related to releasing of connection to the second SCG network to the second MCG network when the state of communication with the first MCG network connected based on the first subscriber identity information of the first SIM is switched to a connected state.

According to various embodiments, the method may further include identifying whether a signal related to an IP multimedia subsystem (IMS) is transmitted and/or received through a second MCG network connected based on the second subscriber identity information of the second SIM when addition of the second SCG network, based on the second subscriber identity information, is restricted based on that the state of commination with the first MCG network is a connected state, and switching the state of communication with the second MCG network to an idle state when the signal related to the IMS has not been transmitted and/or received through the second MCG network for a designated time interval and execution of an application program related to the IMS ends.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
   a first subscriber identity module (SIM) comprising circuitry and first subscriber identity information;
   a second SIM comprising circuitry and second subscriber identify information;
   a wireless communication circuit;
   at least one processor operatively connected to the first SIM, the second SIM, and the communication circuit; and
   memory storing instructions,
   wherein the instructions, when executed by the at least one processor, cause the electronic device to:
   configure the first SIM to be used for data communication; and
   when a first long term evolution (LTE) network connected using the first SIM is in a radio resource control (RRC) connected state, restrict dual connectivity (DC) operation of network connection using the second SIM while a connection with a second LTE network using the second SIM is maintained,
   wherein the restricting DC operation of network connection using the second SIM comprises restricting addition of a new radio (NR) network of network connection using the second SIM.

2. The electronic device of claim 1, wherein the instructions, when executed by the at least one processor, cause the electronic device to maintain a DC support state of a UE capability related to the second LTE network connected using the second SIM, when the data communication using the first SIM has been configured.

3. The electronic device of claim 1, wherein the instructions, when executed by the at least one processor, cause the electronic device to restrict at least one of a measurement operation and a measurement report operation related to the NR network, when measurement configuration is received from the second LTE network connected using the second SIM while the DC operation of network connection using the second SIM is restricted.

4. The electronic device of claim 1, wherein the instructions, when executed by the at least one processor, cause the electronic device to transmit, when a message related to a request for cell addition and/or handover of the NR network is received from the second LTE network connected using the second SIM while the DC operation of network connection using the second SIM is restricted, a message related to failure in the request for cell addition and/or handover to the second LTE network connected using the second SIM through at least the wireless communication circuit.

5. The electronic device of claim 1, wherein the instructions, when executed by the at least one processor, cause the electronic device to restrict the DC operation of network connection using the second SIM when the first LTE network connected using the first SIM is the RRC connected state, and the DC operation of network connection is configured through the first LTE network connected using the first SIM.

6. The electronic device of claim 5, wherein the instructions, when executed by the at least one processor, cause the electronic device to allow the DC operation of network connection using the second SIM when the first LTE network connected using the first SIM is a RRC idle state, or when the first LTE network connected using the first SIM is the RRC connected state and the DC operation of network connection is not configured through the first LTE network connected using the first SIM.

7. The electronic device of claim 1, wherein the instructions, when executed by the at least one processor, cause the electronic device to:
   establish the connection with the NR network through the second LTE network connected using the second SIM when the DC operation of network connection using the second SIM is allowed; and
   transmit information related to releasing of connection to the NR network to the second LTE network connected using the second SIM when the first LTE network connected using the first SIM is switched from a RRC idle state to the RRC connected state.

8. The electronic device of claim 1, wherein the instructions, when executed by the at least one processor, cause the electronic device to:
   identify whether a signal related to an IP multimedia subsystem (IMS) is transmitted and/or received through the second LTE network connected using the second SIM when the DC operation of network connection using the second SIM is restricted based on that the first LTE network connected using the first SIM is the RRC connected state; and
   switch the second LTE network connected using the second SIM from the RRC connected state to a RRC idle state when the signal related to the IMS has not been transmitted and/or received through the second LTE network connected using the second SIM for a designated time interval and execution of an application program related to the IMS ends.

9. The electronic device of claim 1, wherein the instructions, when executed by the at least one processor, cause the electronic device to restrict the DC operation of network connection using the second SIM when a radio access technology (RAT) of the first SIM is a network supporting DC, the first LTE network connected using the first SIM is the RRC connected state, and the DC operation of network connection is configured through the first LTE network connected using the first SIM.

10. The electronic device of claim 9, wherein the instructions, when executed by the at least one processor, cause the electronic device to allow the DC operation of network connection using the second SIM when the RAT of the first SIM is a network not supporting DC, when the first LTE network connected using the first SIM is a RRC idle state, or when the first LTE network connected using the first SIM is the RRC connected state and the DC operation of network connection is not configured through the first LTE network connected using the first SIM.

11. An operation method of an electronic device comprising multiple subscriber identity modules (SIMs), the method comprising:
   configuring the first SIM to be used for data communication; and
   when a first long term evolution (LTE) network connected using the first SIM is in a radio resource control (RRC) connected state, restricting dual connectivity (DC) operation of network connection using the second SIM while a connection with a second LTE network using the second SIM is maintained,
   wherein the restricting DC operation of network connection using the second SIM comprises restricting addition of a new radio (NR) network of network connection using the second SIM.

12. The method of claim 11, further comprising maintaining a DC support state of a UE capability related to the second LTE network connected using the second SIM, when the data communication using the first SIM has been configured.

13. The method of claim 11, further comprising restricting at least one of a measurement operation and a measurement report operation related to the NR network when measurement configuration is received from the second LTE network connected using the second SIM while the DC operation of network connection using the second SIM is restricted.

14. The method of claim 11, further comprising, when a message related to a request for cell addition and/or handover of the NR network is received from the second LTE network using the second SIM while the DC operation of network connection using the second SIM is restricted, transmitting a message related to failure in the request for cell addition and/or handover to the second LTE network connected using the second SIM.

15. The method of claim 11, wherein the restricting of the DC operation of network connection using the second SIM comprises restricting the DC operation of network connection using the second SIM when the first LTE network connected using the first SIM is the RRC connected state and the DC operation of network connection is configured through the first LTE network connected using the first SIM.

16. The method of claim 15, further comprising;
allowing the DC operation of network connection using the second SIM when the first LTE network connected using the first SIM is a RRC idle state, or when the first LTE network connected using the first SIM is the RRC connected state and the DC operation of network connection is not configured through the first LTE network connected using the first SIM.

17. The method of claim 11, further comprising:
identifying whether a signal related to an IP multimedia subsystem (IMS) is transmitted and/or received through the second LTE network connected using the second SIM when the DC operation of network connection using the second SIM is restricted based on that the first LTE network connected using the first SIM is the RRC connected state; and
switching the second LTE network connected using the second SIM from the RRC connected state to a RRC idle state when the signal related to the IMS has not been transmitted and/or received through the second LTE network connected using the second SIM for a designated time interval and execution of an application program related to the IMS ends.

18. The method of claim 11, wherein the restricting of the DC operation comprises restricting the DC operation of network connection using the second SIM when a radio access technology (RAT) of the first SIM is a network supporting DC, the first LTE network connected using the first SIM is the RRC connected state, and the DC operation of network connection is configured through the first LTE network connected using the first SIM.

19. The method of claim 18, further comprising;
allowing the DC operation of network connection using the second SIM when the RAT of the first SIM is a network not supporting DC, when the first LTE network using the first SIM is a RRC idle state, or when the DC operation of network connection is not configured through the first LTE network connected using the first SIM.

20. The method of claim 11, further comprising:
establishing the connection with the NR network through the second LTE network connected using the second SIM when the DC operation of network connection using the second SIM is allowed; and
transmitting information related to releasing of connection to the NR network to the second LTE network connected using the second SIM when the first LTE network connected using the first SIM is switched from a RRC idle state to the RRC connected state.

\* \* \* \* \*